US010221358B2

(12) United States Patent
Bae et al.

(10) Patent No.: US 10,221,358 B2
(45) Date of Patent: Mar. 5, 2019

(54) LIQUID CRYSTAL COMPOSITION AND LIQUID CRYSTAL DISPLAY INCLUDING THE SAME

(71) Applicant: SAMSUNG DISPLAY CO., LTD., Yongin-si, Gyeonggi-do (KR)

(72) Inventors: Ji Hong Bae, Yongin-si (KR); Sung-Hwan Hong, Suwon-si (KR); Keun Chan Oh, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/457,134

(22) Filed: Mar. 13, 2017

(65) Prior Publication Data

US 2018/0010045 A1 Jan. 11, 2018

(30) Foreign Application Priority Data

Jul. 7, 2016 (KR) ........................ 10-2016-0085992

(51) Int. Cl.

| | |
|---|---|
| ***G02F 1/1333*** | (2006.01) |
| ***C09K 19/34*** | (2006.01) |
| ***C09K 19/56*** | (2006.01) |
| ***G02F 1/1335*** | (2006.01) |
| ***G02F 1/1337*** | (2006.01) |

(52) U.S. Cl.

CPC .......... *C09K 19/3405* (2013.01); *C09K 19/56* (2013.01); *G02F 1/1337* (2013.01); *G02F 1/133512* (2013.01); *G02F 1/133707* (2013.01); *C09K 2019/3408* (2013.01)

(58) Field of Classification Search

CPC ................ C09K 19/3405; C09K 19/56; C09K 2019/3408; G02F 1/1333; G02F 1/1337; G02F 1/133512; G02F 1/133707

USPC ..................................................... 252/299.62

See application file for complete search history.

(56) References Cited

U.S. PATENT DOCUMENTS

| | | | | |
|---|---|---|---|---|
| 7,514,127 B2 * | 4/2009 | Lietzau | C07C 25/22 252/299.61 |
| 2011/0091392 A1 | 4/2011 | Bombardelli et al. | |
| 2013/0237501 A1 | 9/2013 | Chong et al. | |
| 2015/0259602 A1 * | 9/2015 | Reiffenrath | C09K 19/3405 252/299.61 |

FOREIGN PATENT DOCUMENTS

| | | | |
|---|---|---|---|
| CN | 1506358 | A | 6/2004 |
| CN | 100415730 | C | 9/2008 |
| DE | 19900517 | A1 | 7/1999 |
| DE | 19909760 | B4 | 5/2015 |
| KR | 1020050105982 | A | 11/2005 |
| KR | 1020100072044 | A | 6/2010 |
| KR | 20100134685 | A | 12/2010 |
| KR | 20140054287 | A | 5/2014 |
| KR | 1020150108325 | A | 9/2015 |
| WO | 2009129926 | A1 | 10/2009 |
| WO | 2013028371 | A1 | 2/2013 |

OTHER PUBLICATIONS

Detlef Pauluth, et al., "Advanced liquid crystals for television", J. Mater. Chem., 2004, v. 14, pp. 1219-1227.

* cited by examiner

*Primary Examiner* — Geraldina Visconti
(74) *Attorney, Agent, or Firm* — Cantor Colburn LLP

(57) ABSTRACT

A liquid crystal composition includes at least one of liquid crystal molecules represented by Chemical Formulas A and B:

Chemical Formula A

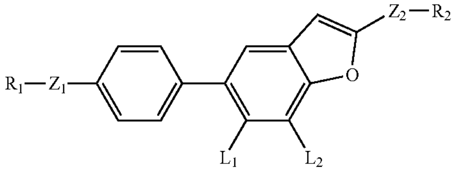

Chemical Formula B

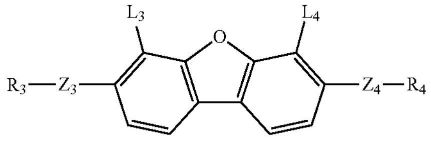

where in Chemical Formulas A and B, $L_1$ to $L_4$ are each independently —H, —F, —Cl, —$OCF_3$, —$CF_3$, —$CH_2F$, or —$CHF_2$, $R_1$ to $R_4$ are each independently hydrogen, a halogen, a cyano group, a C1-C12 alkyl group, or a C1-C12 alkoxy group, and $Z_1$ to $Z_4$ are each independently a single bond, —O—, —COO—, —OCO—, —$CF_2O$—, —$OCF_2$-, —$CH_2O$—, —$OCH_2$-, —$SCH_2$-, —$CH_2S$—, —$CH_2CH_2$-, —$C_2F_4$-, —$CH_2CF_2$-, —$CF_2CH_2$-, —$CH_{2n}$-, where n is a natural number of 1 to 12, —CH═CH—, —CF═CF—, —CH═CF—, —CF═CH—, —C≡C—, or —CH═CHCH$_2$O.

21 Claims, 5 Drawing Sheets

LIQUID CRYSTAL COMPOSITION AND LIQUID CRYSTAL DISPLAY INCLUDING THE SAME

This application claims priority to and the benefit of Korean Patent Application No. 10-2016-0085992, filed in the Korean Intellectual Property Office on Jul. 7, 2016, and all the benefits accruing therefrom under 35 U.S.C. § 119, the entire contents of which are incorporated herein by reference.

BACKGROUND

(a) Technical Field

The present disclosure relates to a liquid crystal composition and a liquid crystal display including the same.

(b) Description of the Related Art

A liquid crystal display (LCD) is one of the most widely used types of flat panel displays, and includes two display panels facing each other, a liquid crystal layer interposed between the two display panels, an electric field generating electrode such as a pixel electrode and a common electrode positioned on at least one of two display panels, and the like. In the liquid crystal display, an electric field is generated in a liquid crystal layer by applying a voltage to the electric field generating electrode, such that the direction of liquid crystal molecules positioned in the liquid crystal layer may be changed and transmittance of light transmitting the liquid crystal layer may be adjusted.

In the liquid crystal display, a liquid crystal composition plays an important role in adjusting the transmittance of light to obtain a desired image. Particularly, as the liquid crystal display is variously used, the liquid crystal display advantageously possesses various characteristics such as low voltage operation, high voltage holding ratio (VHR), wide viewing angle characteristics, wide dynamic temperature range, high speed response, and the like. In order to improve the high-speed response characteristics, etc. of the liquid crystal display, research into a technology which improves physical properties the liquid crystal composition, such as a rotational viscosity, a refractive index, an elastic coefficient, and the like, has been conducted.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a liquid crystal composition having advantages of high polarity, low viscosity characteristics, and a high phase transition temperature to manufacture a high-performance liquid crystal display.

An exemplary embodiment of the present disclosure provides a liquid crystal composition including at least one of liquid crystal molecules represented by Chemical Formulas A and B below:

Chemical Formula A

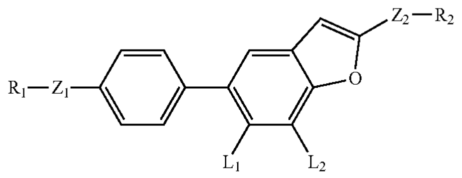

Chemical Formula B

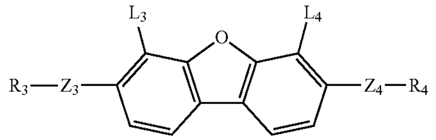

where in Chemical Formulas A and B, $L_1$ to $L_4$ are each independently —H, —F, —Cl, —$OCF_3$, —$CF_3$, —$CH_2F$, or —$CHF_2$, $R_1$ to $R_4$ are each independently hydrogen, a halogen, a cyano group, a C1-C12 alkyl group, or a C1-C12 alkoxy group, and $Z_1$ to $Z_4$ are each independently a single bond, —O—, —COO—, —OCO—, —$CF_2O$—, —$OCF_{2}$-, —$CH_2O$—, —$OCH_{2}$-, —$SCH_{2}$-, —$CH_2S$—, —$CH_2CH_{2}$-, —$C_2F_{4}$-, —$CH_2CF_{2}$-, —$CF_2CH_{2}$-, —$CH_{2n}$-, where n is a natural number of 1 to 12, —CH═CH—, —CF═CF—, —CH═CF—, —CF═CH—, —C≡C—, or —CH═$CHCH_2O$—.

In an exemplary embodiment, the liquid crystal composition may further include at least one of liquid crystal molecules represented by Chemical Formulas N-1 to N-4 below:

Chemical Formula N-1

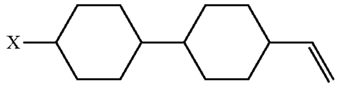

Chemical Formula N-2

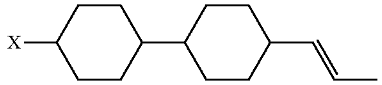

Chemical Formula N-3

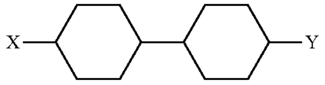

Chemical Formula N-4

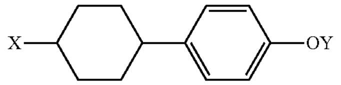

where in Chemical Formulas N-1 to N-4 above, X and Y are each independently a C1-C5 alkyl group.

In an exemplary embodiment, the liquid crystal composition may further include at least one of liquid crystal molecules represented by Chemical Formulas N-5 to N-9 below:

Chemical Formula N-5

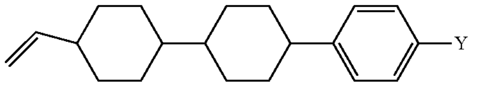

Chemical Formula N-6

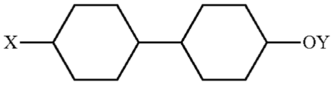

Chemical Formula N-7

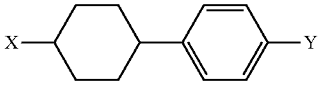

Chemical Formula N-8

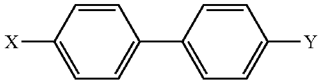

Chemical Formula N-9

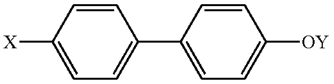

where in Chemical Formulas N-5 to N-9 above, X and Y are each independently a C1-C5 alkyl group.

In an exemplary embodiment, the liquid crystal composition may further include at least one of liquid crystal molecules represented by Chemical Formulas P-1 to P-3 below:

Chemical Formula P-1

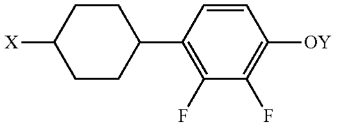

Chemical Formula P-2

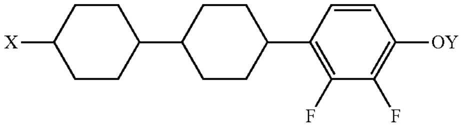

Chemical Formula P-3

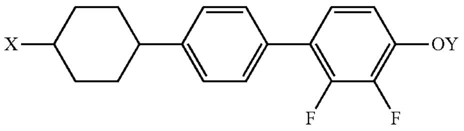

Where in Chemical Formulas P-1 to P-3 above, X and Y are each independently a C1-C5 alkyl group.

The liquid crystal composition may further include at least one of liquid crystal molecules represented by Chemical Formulas P-4 to P-10 below:

Chemical Formula P-4

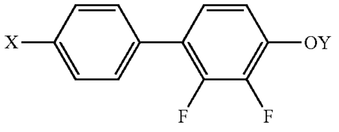

-continued

Chemical Formula P-5

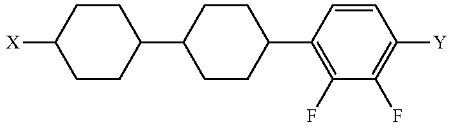

Chemical Formula P-6

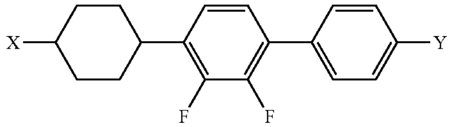

Chemical Formula P-7

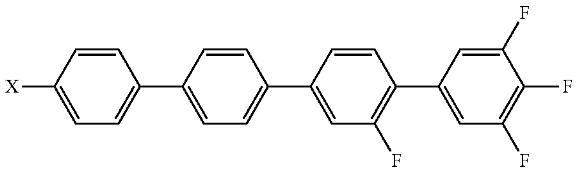

Chemical Formula P-8

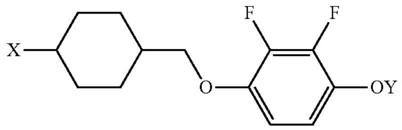

Chemical Formula P-9

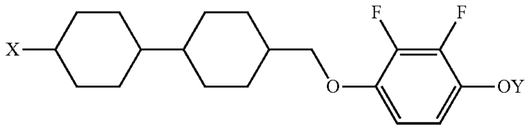

Chemical Formula P-10

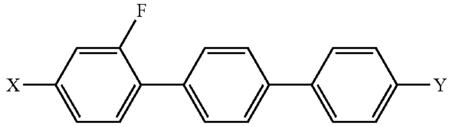

where in Chemical Formulas P-4 to P-10 above, X and Y are each independently a C1-C5 alkyl group.

In an exemplary embodiment, the liquid crystal composition may further include at least one of liquid crystal molecules represented by Chemical Formulas N-1 to N-3, N-10, and N-11 below:

Chemical Formula N-1

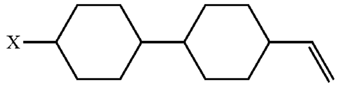

Chemical Formula N-2

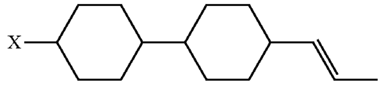

Chemical Formula N-3

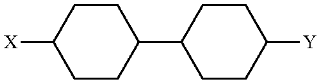

-continued

Chemical Formula N-10

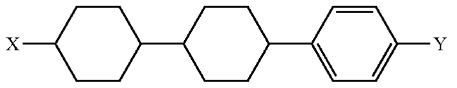

Chemical Formula N-11

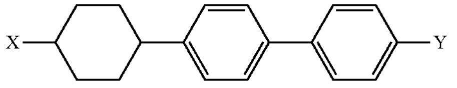

where in Chemical Formulas N-1 to N-3, N-10, and N-11 above, X and Y are each independently a C1-C5 alkyl group.

In an exemplary embodiment, Chemical Formula A may be Chemical Formula A-1 below, and Chemical Formula B may be Chemical Formula B-1 below:

Chemical Formula A-1

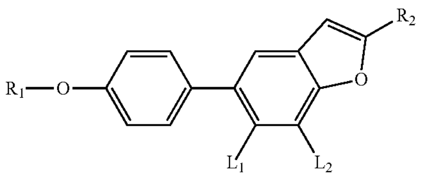

Chemical Formula B-1

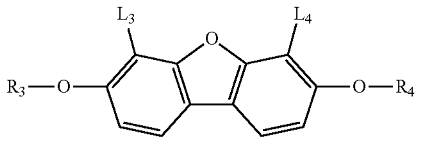

where in Chemical Formulas A-1 and B-1 above, $L_1$ to $L_4$ are each independently —H, —F, —Cl, —$OCF_3$, —$CF_3$, —$CH_2F$, or —$CHF_2$, and $R_1$ to $R_4$ are each independently hydrogen, a halogen, a cyano group, a C1-C12 alkyl group, or a C1-C12 alkoxy group.

In an exemplary embodiment, the at least one of the liquid crystal molecules represented by Chemical Formulas A and B above may be present in an amount of about 1 weight percent (wt %) to about 10 wt %, based on a total weight of the liquid crystal composition.

A liquid crystal display according to an exemplary embodiment of the present disclosure includes a first substrate, a second substrate overlapping the first substrate, and a liquid crystal layer positioned between the first substrate and the second substrate, and including at least one of liquid crystal molecules represented by Chemical Formulas A and B below:

Chemical Formula A

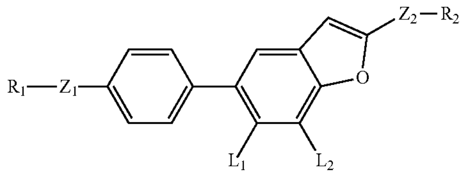

-continued

Chemical Formula B

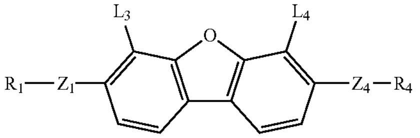

where in Chemical Formulas A and B, $L_1$ to $L_4$ are each independently —H, —F, —Cl, —$OCF_3$, —$CF_3$, —$CH_2F$, or —$CHF_2$, $R_1$ to $R_4$ are each independently hydrogen, a halogen, a cyano group, a C1-C12 alkyl group, or a C1-C12 alkoxy group, and $Z_1$ to $Z_4$ are each independently a single bond, —O—, —COO—, —OCO—, —$CF_2O$—, —$OCF_2$-, —$CH_2O$—, —$OCH_2$-, —$SCH_2$-, —$CH_2S$—, —$CH_2CH_2$-, —$C_2F_4$-, —$CH_2CF_2$-, —$CF_2CH_2$-, —$CH_{2n}$-, wherein is a natural number of 1 to 12, —CH═CH—, —CF═CF—, —CH═CF—, —CF═CH—, —C≡C—, or —CH═$CHCH_2O$—.

The liquid crystal layer may further include at least one of liquid crystal molecules represented by Chemical Formulas N-1 to N-4 below:

Chemical Formula N-1

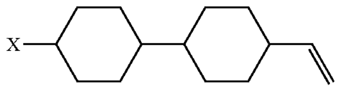

Chemical Formula N-2

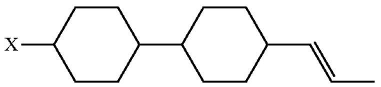

Chemical Formula N-3

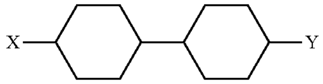

Chemical Formula N-4

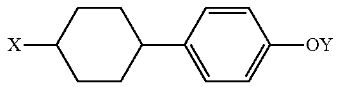

where in Chemical Formulas N-1 to N-4 above, X and Y are each independently a C1-C12 alkyl group.

In an exemplary embodiment, the liquid crystal layer may further include at least one of liquid crystal molecules represented by Chemical Formulas P-1 to P-3 below:

Chemical Formula P-1

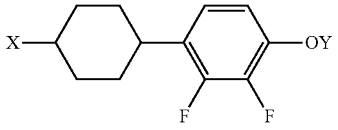

Chemical Formula P-2

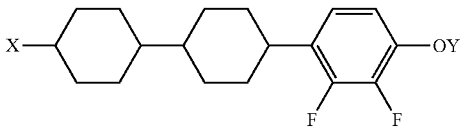

-continued

Chemical Formula P-3

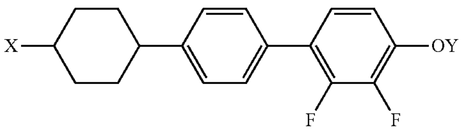

where in Chemical Formulas P-1 to P-3 above, X and Y are each independently a C1-C12 alkyl group.

In an exemplary embodiment, the liquid crystal molecules may further include at least one of liquid crystal molecules represented by Chemical Formulas N-1 to N-3, N-10, and N-11 below:

Chemical Formula N-1

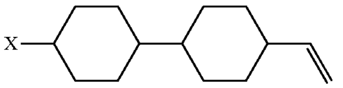

Chemical Formula N-2

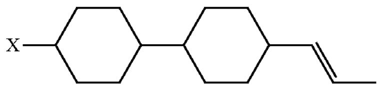

Chemical Formula N-3

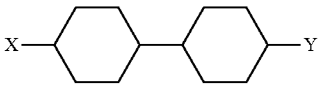

Chemical Formula N-10

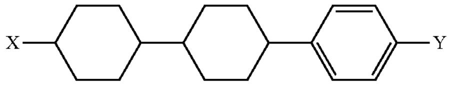

Chemical Formula N-11

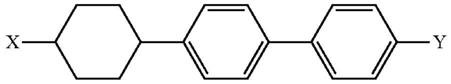

where in Chemical Formulas N-1 to N-3, N-10, and N-11 above, X and Y are each independently a C1-C12 alkyl group.

In an exemplary embodiment, the liquid crystal molecules may further include at least one of liquid crystal molecules represented by Chemical Formulas P-1 to P-3 below:

Chemical Formula P-1

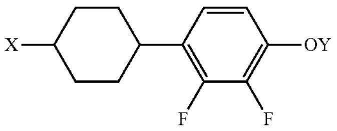

Chemical Formula P-2

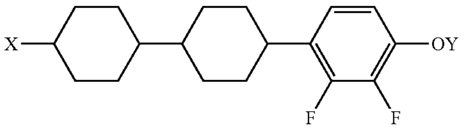

-continued

Chemical Formula P-3

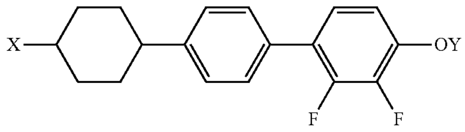

where in Chemical Formulas P-1 to P-3 above, X and Y are each independently a C1-C12 alkyl group.

In an exemplary embodiment, Chemical Formula A may be Chemical Formula A-1 below, and Chemical Formula B may be Chemical Formula B-1 below:

Chemical Formula A-1

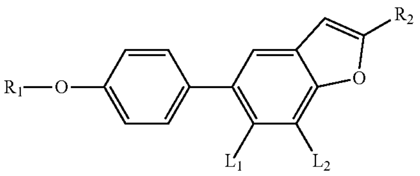

Chemical Formula B-1

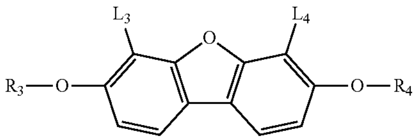

where in Chemical Formulas A-1 and B-1 above, $L_1$ to $L_4$ are each independently —H, —F, —Cl, —$OCF_3$, —$CF_3$, —$CH_2F$, or —$CHF_2$, and $R_1$ to $R_4$ are each independently hydrogen, a halogen, a cyano group, a C1-C12 alkyl group, or a C1-C12 alkoxy group.

In an exemplary embodiment, the liquid crystal display may further include a light blocking member between the first substrate and the liquid crystal layer, wherein the light blocking member may include a main light blocking part and a spacer connected to the main light blocking part.

In an exemplary embodiment, the liquid crystal display may further include a first alignment layer between the first substrate and the liquid crystal layer, a second alignment layer between the second substrate and the liquid crystal layer, and a plurality of bumps between the first alignment layer and the liquid crystal layer.

In an exemplary embodiment, a pre-tilt of liquid crystal molecules adjacent to the first alignment layer may be different from a pre-tilt of liquid crystal molecules adjacent to the second alignment layer.

According to exemplary embodiments, a liquid crystal composition having high polarity, low viscosity characteristics, and a high phase transition temperature may be provided, and a high-performance liquid crystal display including the liquid crystal composition may also be provided.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
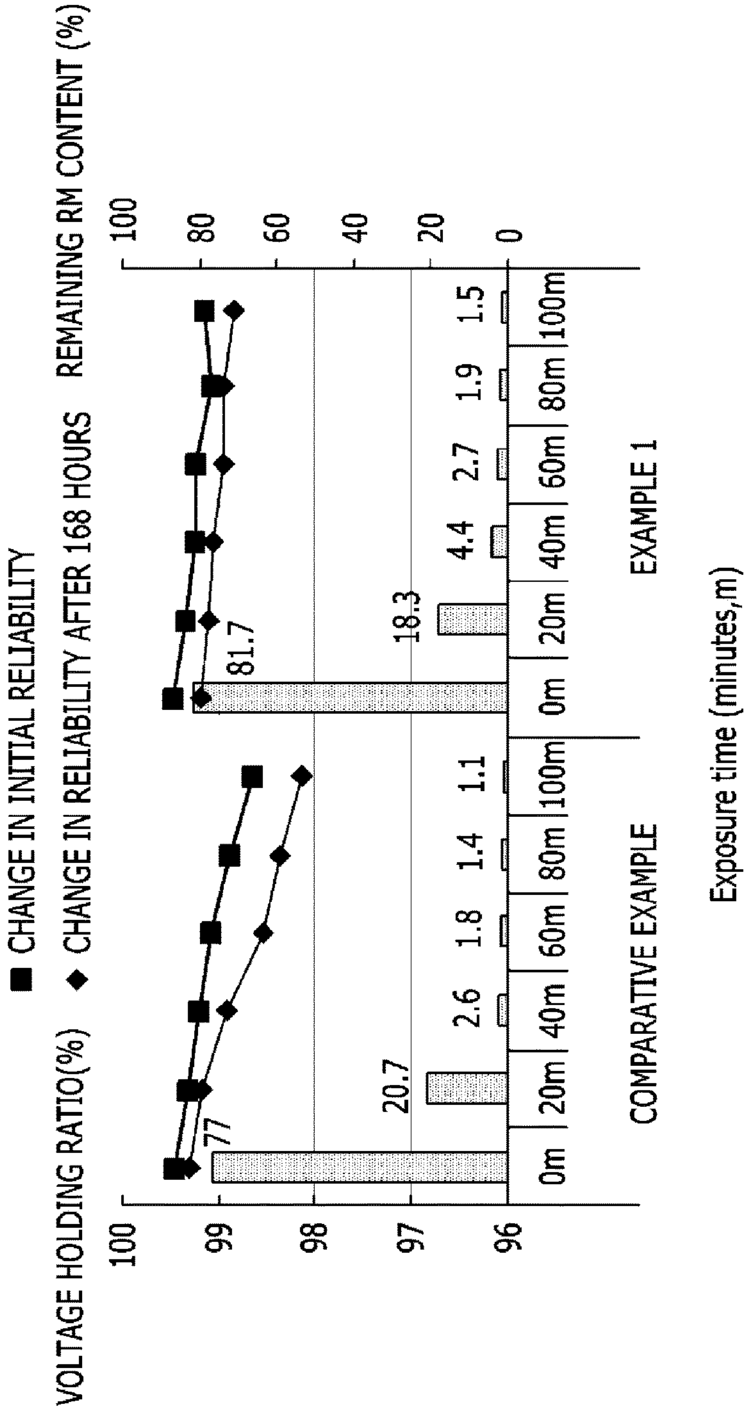
FIG. 1 is a graph of the voltage holding ratio (percent, %) versus exposure time (minutes) to ultraviolet light and of the remaining reactive mesogen content (%) versus time for the liquid crystal compositions of Example 1 and the Comparative Example.

Hereinafter, exemplary embodiments will be described in detail with reference to the accompanying drawings so that those skilled in the art may easily practice the present disclosure. The present disclosure may be implemented in various different forms, and is not limited to exemplary embodiments described herein.

Portions unrelated to the description will be omitted in order to obviously describe the present disclosure, and similar components will be denoted by the same reference numerals throughout the present specification.

Further, the size and thickness of each constitution shown in the drawings are arbitrarily shown for convenience of explanation, and therefore, the present disclosure is not necessarily limited to the shown exemplary embodiments in the drawings. In the drawings, the thickness of various layers and regions, are exaggerated for clarity. In the drawings, thicknesses of partial layers and regions are exaggerated for convenience of explanation.

It will be understood that when an element such as a layer, film, region, or substrate is referred to as being “above” or “on” another element, it can be directly on the other element or intervening elements may also be present therebetween. In contrast, when an element is referred to as being “directly on” another element, there are no intervening elements present. Further, when an element is referred to as being “above” or “on” a reference element, it can be positioned above or below the reference element, and it is not necessarily referred to as being positioned “above” or “on” in a direction opposite to gravity.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

The terminology used herein is for the purpose of describing particular embodiments only and is not intended to be limiting. As used herein, the singular forms “a,” “an,” and “the” are intended to include the plural forms, including “at least one,” unless the content clearly indicates otherwise. “Or” means “and/or.” As used herein, the term “and/or” includes any and all combinations of one or more of the associated listed items. In addition, unless explicitly described to the contrary, the word “comprise” and variations such as “comprises” or “comprising”, will be understood to imply the inclusion of stated elements but not the exclusion of any other elements.

Spatially relative terms, such as “beneath,” “below,” “lower,” “above,” “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the exemplary term “below” can encompass both an orientation of above and below. The device may be otherwise oriented (rotated 90 degrees or at other orientations) and the spatially relative descriptors used herein interpreted accordingly.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” can mean within one or more standard deviations, or within 30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Further, as used herein, the term “on a plane” means a case in which a target part is viewed from the top, and the term “a cross-section” means a case in which a cross section of the target part that is cut in a vertical direction is viewed from the side.

A liquid crystal composition according to an exemplary embodiment of the present disclosure includes at least one of liquid crystal molecules represented by Chemical Formulas A and B below:

Chemical Formula A

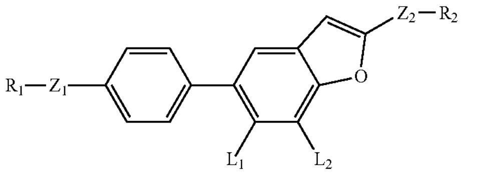

Chemical Formula B

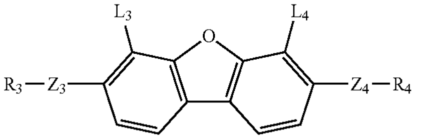

where in Chemical Formulas A and B, $L_1$ to $L_4$ are each independently —H, —F, —Cl, —$OCF_3$, —$CF_3$, —$CH_2F$, or —$CHF_2$, $R_1$ to $R_4$ are each independently hydrogen, a halogen, a cyano group, a C1-C12 alkyl group, or a C1-C12 alkoxy group, and $Z_1$ to $Z_4$ are each independently a single bond, —O—, —COO—, —OCO—, —$CF_2O$—, —$OCF_2$-, —$CH_2O$—, —$OCH_2$-, —$SCH_2$-, —$CH_2S$—, —$CH_2CH_2$-, —$C_2F_4$-, —$CH_2CF_2$-, —$CF_2CH_2$-, —$CH_{2n}$- (where n is a natural number of 1 to 12), —CH═CH—, —CF═CF—, —CH═CF—, —CF═CH—, —C≡C—, or —$CH═CHCH_2O$—.

A liquid crystal display in which the liquid crystal composition according to the present exemplary embodiment is used may have a vertical alignment (VA) mode. In the vertical alignment (VA) mode, an orientation of the liquid crystal molecules may be changed by applying an electric field to a liquid crystal layer in a state in which the liquid crystal molecules are oriented in a substantially vertical direction to a substrate surface. The state in which the liquid crystal molecules are oriented in the substantially vertical direction may indicate a state in which the liquid crystal molecules are tilted 10 degrees or less relative to a line which is substantially vertical (e.g. perpendicular) to the substrate surface.

Performance evaluation targets of the liquid crystal display include response speed, power consumption, luminance, contrast ratio, viewing angle, operating temperature range, reliability, etc. The performance of the liquid crystal display is affected by the physical properties of the liquid crystal composition. The liquid crystal composition may consist essentially of, or consist of about 10 to 20 different types of liquid crystal molecules, and a combination of the liquid crystal molecules may provide the desired physical and electrical properties. The liquid crystal composition used in the liquid crystal display in the vertical alignment (VA) mode has low voltage driving, high speed response, wide operating temperature range, etc.

The liquid crystal molecule may be divided into a polar liquid crystal molecule and a neutral liquid crystal molecule, wherein the polar liquid crystal molecule has a positive value or a negative value of dielectric anisotropy (Δε), and the neutral liquid crystal molecule has almost no (e.g. zero) dielectric anisotropy (Δε).

The liquid crystal molecules represented by Chemical Formulas A and B above may be negative polar liquid crystal molecules, for example, polar liquid crystal molecules having a negative value of dielectric anisotropy.

Chemical Formula A may be Chemical Formula A-1 below, and Chemical Formula B may be Chemical Formula B-1 below:

Chemical Formula A-1

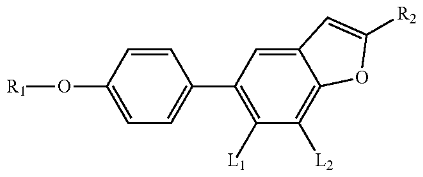

Chemical Formula B-1

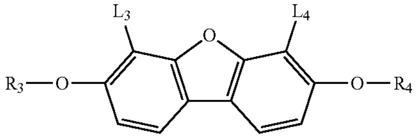

where in Chemical Formulas A-1 and B-1 above, $L_1$ to $L_4$ are each independently —H, —F, —Cl, —$OCF_3$, —$CF_3$, —$CH_2F$, or —$CHF_2$, and $R_1$ to $R_4$ are each independently hydrogen, a halogen, a cyano group, a C1-C12 alkyl group, or a C1-C12 alkoxy group.

Chemical Formula A-1 may be Chemical Formula A-11 below:

Chemical Formula A-11

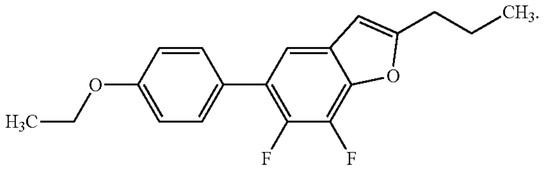

The liquid crystal molecule represented by Chemical Formula A-11 above has a refractive anisotropy (Δn) of about 0.253, a dielectric anisotropy (Δε) of about −7.07, and a phase transition temperature (Tni) of about 77.7 degrees Celsius (° C.).

Hereinafter, a synthesis example of Chemical Formula A-11 above is described.

Chemical Formula A-11 may be synthesized by Reaction Scheme 1 below. The Reaction Scheme 1 below is one example. In the following Reaction Scheme 1, $R^1$ is —$CH_2CH_3$, $R^2$ is —$CH_2CH_2CH_3$, $A^1$ is —O—, and $Z^1$ is 1,4-phenylene:

Reaction Scheme 1

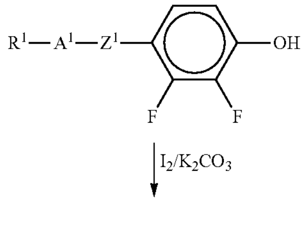

-continued

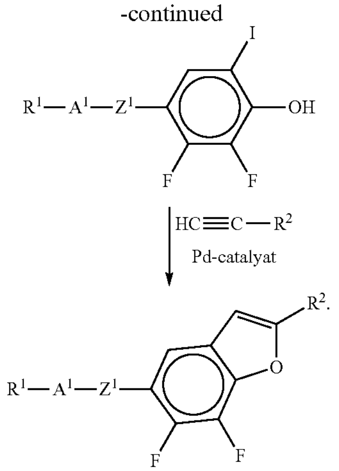

Chemical Formula B-1 may be at least one of Chemical Formulas B-11 and B-12 below:

Chemical Formula B-11

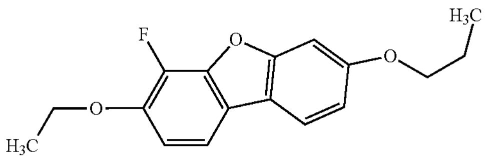

Chemical Formula B-12

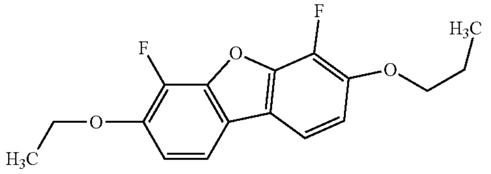

The liquid crystal molecule represented by Chemical Formula B-11 has a refractive anisotropy (Δn) of about 0.281, a dielectric anisotropy (Δε) of about −5.46, and a phase transition temperature (Tni) of about 75.6 degrees Celsius, and the liquid crystal molecule represented by Chemical Formula B-12 has a refractive anisotropy (Δn) of about 0.263, a dielectric anisotropy (Δε) of about −11, and a phase transition temperature (Tni) of about 79.9 degrees Celsius.

Hereinafter, a synthesis example of Chemical Formula B-12 above is described.

The Chemical Formula B-12 may be synthesized by Reaction Scheme 2 below.

The Reaction Scheme 2 below is one example. In Reaction Formula 2 below, $R^1$ and $R^2$ are —$CH_2CH_3$, "n-Buli" is an n-butyl lithium solution in hexane, RT denotes room temperature of about 20 degrees Celsius, and "TIPSCI" is triisopropylsilyl chloride.

The synthesis example of Chemical Formula B-11 may be the same as shown below in Reaction Scheme 2, but omitting the fourth step.

Reaction Scheme 2

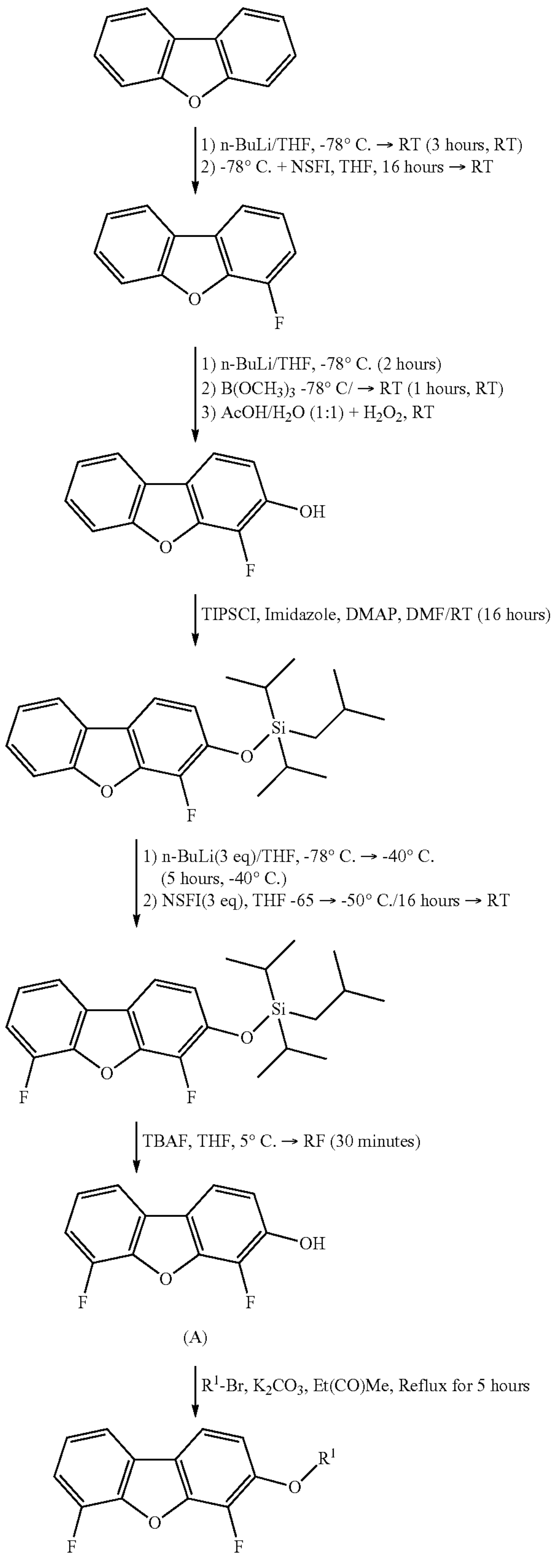

(B)

At least one of the liquid crystal molecules represented by Chemical Formulas A and B above may be present in an amount of about 1 weight percent (wt %) to about 10 wt %, based on a total weight of the liquid crystal composition.

The liquid crystal composition according to the present exemplary embodiment may further include at least one of liquid crystal molecules represented by Chemical Formulas N-1 to N-4 below:

Chemical Formula N-1

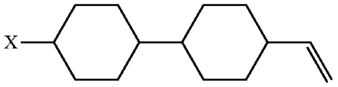

Chemical Formula N-2

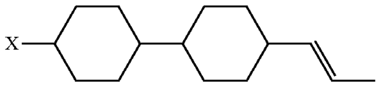

Chemical Formula N-3

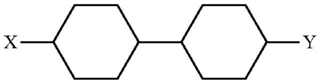

Chemical Formula N-4

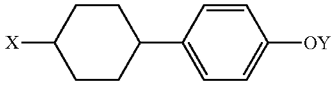

where in Chemical Formulas N-1 to N-4 above, X and Y are each independently a C1-C5 alkyl group.

The liquid crystal molecules represented by N-1 to N-4 may be neutral liquid crystal molecules, respectively.

As an exemplary embodiment, at least one of liquid crystal molecules represented by N-10 and N-11 below may be included instead of the liquid crystal molecule represented by N-4. However, the liquid crystal molecule represented by Chemical Formula N-4 may be used together with the liquid crystal molecules represented by Chemical Formulas N-10 and N-11 below:

Chemical Formula N-10

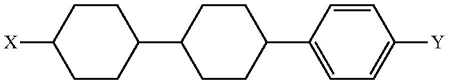

Chemical Formula N-11

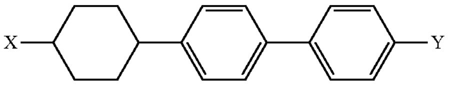

where in Chemical Formulas N-10 and N-11 above, X and Y are each independently a C1-C5 alkyl group.

The liquid crystal composition according to the present exemplary embodiment may further include at least one of liquid crystal molecules represented by Chemical Formulas N-5 to N-9 below:

Chemical Formula N-5

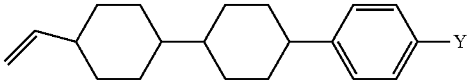

-continued

Chemical Formula N-6

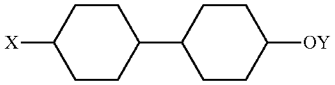

Chemical Formula N-7

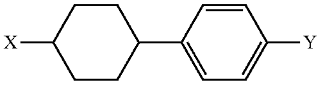

Chemical Formula N-8

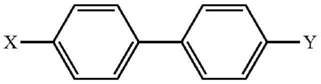

Chemical Formula N-9

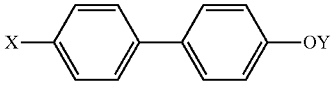

where in Chemical Formulas N-5 to N-9 above, X and Y are each independently a alkyl group.

The liquid crystal molecules represented by N-5 to N-9 may be neutral liquid crystal molecules, respectively.

The liquid crystal composition according to the present exemplary embodiment may further include at least one of liquid crystal molecules represented by Chemical Formulas P-1 to P-3 below:

Chemical Formula P-1

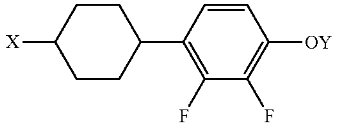

Chemical Formula P-2

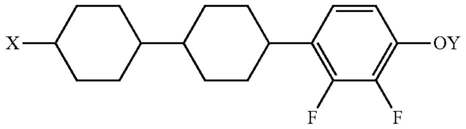

Chemical Formula P-3

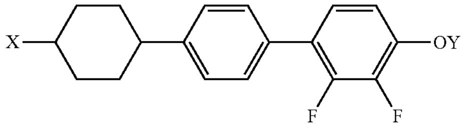

where in Chemical Formulas P-1 to P-3 above, X and Y are each independently a alkyl group.

The liquid crystal molecules represented by P-1 to P-3 may be negative polar liquid crystal molecules, respectively.

The liquid crystal composition according to the present exemplary embodiment may further include at least one of liquid crystal molecules represented by Chemical Formulas P4 to P-10 below:

Chemical Formula P-4

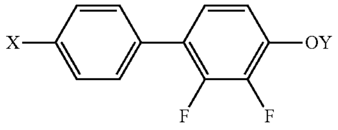

-continued

Chemical Formula P-5

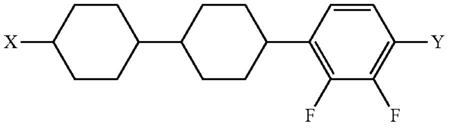

Chemical Formula P-6

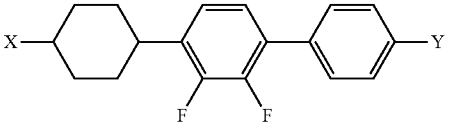

Chemical Formula P-7

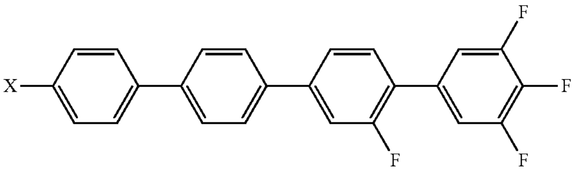

Chemical Formula P-8

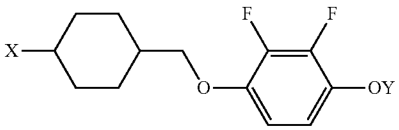

Chemical Formula P-9

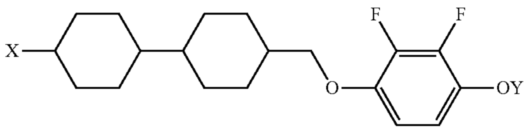

Chemical Formula P-10

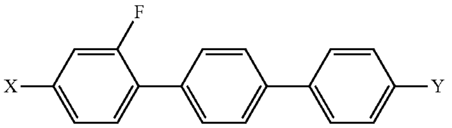

where in Chemical Formulas P-4 to P-10 above, X and Y are each independently a C1-C5 alkyl group.

The liquid crystal molecules represented by P-4 to P-10 may be polar liquid crystal molecules, respectively.

Hereinafter, liquid crystal compositions according to Examples of the present disclosure are described, and the physical properties thereof are compared with Comparative Examples.

TABLE 1

| Liquid crystal molecule | Content (wt %) |
|---|---|
| 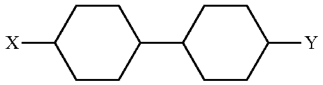 | 31 |
| 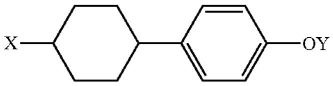 | 7 |
| 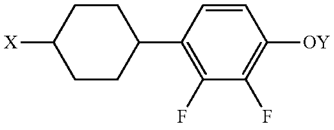 | 15 |
| 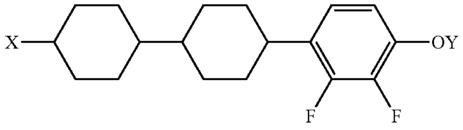 | 14.5 |
| 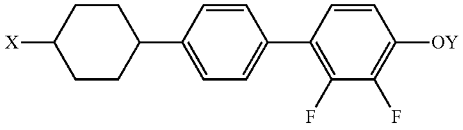 | 18 |
| 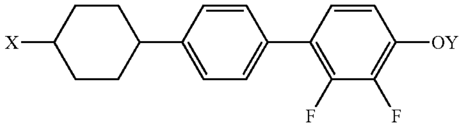 | 14.5 |

In Table 1 above, X and Y are each independently a C1-C5 alkyl group. Table 1 above shows the liquid crystal molecules included in the liquid crystal composition according to the Comparative Example. As a result of evaluating physical properties of the liquid crystal composition according to the Comparative Example, the liquid crystal composition of the Comparative Example has a refractive index anisotropy (Δn) of about 0.105 to about 0.115, a dielectric anisotropy (Δε) of about −3.5 to about −2.5, a phase transition temperature (Tni) of about 75 degrees Celsius to 77 degrees Celsius, a band elastic constant (K33) of about 12.0 to about 14.0, and a rotational viscosity (γ1) of about 110 to about 130 millipascal seconds (mPa·s).

The liquid crystal composition according to the Comparative Example includes a terphenyl-based liquid crystal molecule represented by the Chemical Formula P6 below:

Chemical Formula P-6

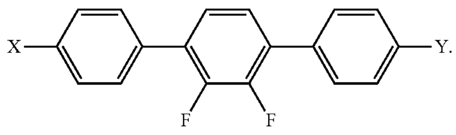

In Chemical Formula P6, X and Y are each independently a C1-C5 alkyl.

A specific example of the terphenyl-based liquid crystal molecule represented by Chemical Formula P-6 includes a liquid crystal molecule represented by Chemical Formula P-6-1 below. The liquid crystal molecule of Chemical Formula P-6-1 below has a refractive anisotropy (Δn) of 0.244, a dielectric anisotropy (Δε) of −3.1, and a phase transition temperature (Tni) of 93.9 degrees Celsius:

Chemical Formula P-6-1

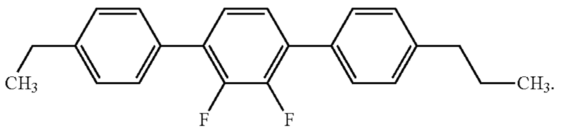

The terphenyl-based liquid crystal molecule increases the reactivity of a reactive mesogen (RM). The reactive mesogen is an orientation aid which improves reliability and which has a high refractive anisotropy of 0.20 or more, such that it is easy to control a cell gap of the liquid crystal display to be about 3 micrometers or less.

The cell gap may indicate a thickness of the liquid crystal layer including the liquid crystal composition.

TABLE 2

| Liquid crystal molecule | Content (wt %) |
|---|---|
| 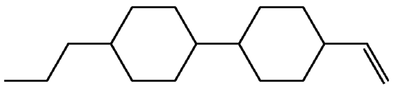 [SMILES: C=CC1CCC(C2CCC(CCC)CC2)CC1] | 10 |
| 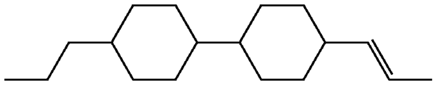 [SMILES: C/C=C/C1CCC(C2CCC(CCC)CC2)CC1] | 12 |
| 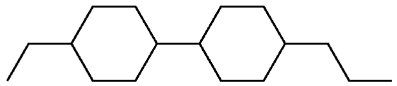 [SMILES: CCCC1CCC(C2CCC(CC)CC2)CC1] | 14 |
| 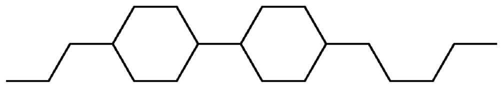 [SMILES: CCCCCC1CCC(C2CCC(CCC)CC2)CC1] | 5 |
| 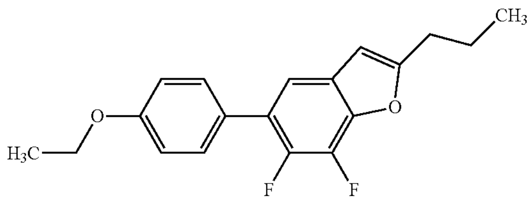 [SMILES: CCCc1cc2cc(-c3ccc(OCC)cc3)c(F)c(F)c2o1] | 7 |
| 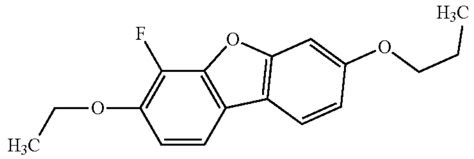 [SMILES: CCCOc1ccc2c(c1)oc1c(F)c(OCC)ccc12] | 6 |
| 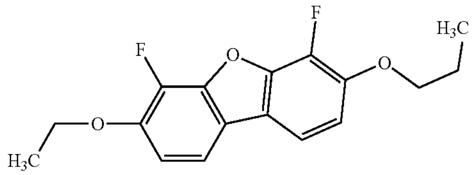 [SMILES: CCCOc1ccc2c(oc3c(F)c(OCC)ccc32)c1F] | 6 |
| 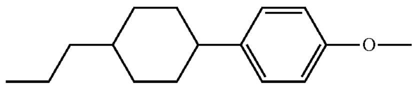 | 4 |
| 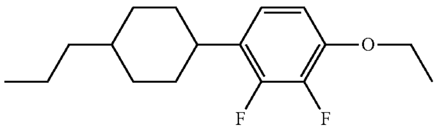 [SMILES: CCCC1CCC(c2ccc(OCC)c(F)c2F)CC1] | 9 |
| 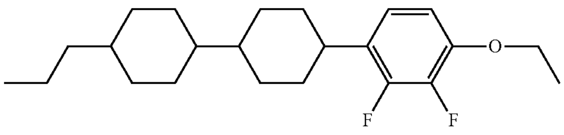 [SMILES: CCCC1CCC(C2CCC(c3ccc(OCC)c(F)c3F)CC2)CC1] | 6 |

TABLE 2-continued

| Liquid crystal molecule | Content (wt %) |
| --- | --- |
| 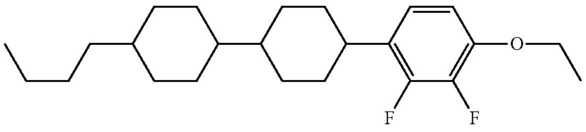 [SMILES: CCCCC1CCC(C2CCC(c3ccc(OCC)c(F)c3F)CC2)CC1] | 6 |
| 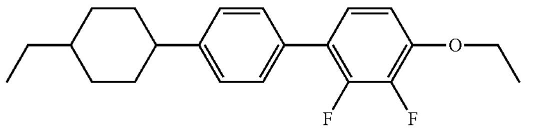 [SMILES: CCOc1ccc(-c2ccc(C3CCC(CC)CC3)cc2)c(F)c1F] | 6 |
| 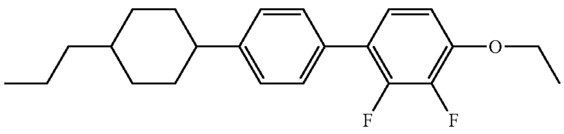 [SMILES: CCCC1CCC(c2ccc(-c3ccc(OCC)c(F)c3F)cc2)CC1] | 9 |

Table 2 above shows the liquid crystal molecules included in the liquid crystal composition according to Example 1. As a result of evaluating physical properties of the liquid crystal composition according to Example 1, the liquid crystal composition of Example 1 has a refractive index anisotropy (Δn) of about 0.110, a dielectric anisotropy (Δε) of about −3.1, a phase transition temperature (Tni) of about 74 degrees Celsius, a band elastic constant (K33) of about 13.9, and a rotational viscosity (γ1) of about 94 mPa·s.

The liquid crystal composition according to the Comparative Example as described above has advantages that are obtainable by including the terphenyl-based liquid crystal molecule, but the terphenyl-based liquid crystal molecule reduces a voltage holding ratio and thus decreases the reliability of the liquid crystal display. In order to improve reliability of the liquid crystal display, the liquid crystal composition according to Example 1 includes the liquid crystal molecules represented by Chemical Formulas A-11, B-11, and B-12 (shown below) while omitting the terphenyl-based liquid crystal molecule.

The liquid crystal molecules represented by Chemical Formulas A-11, B-11, and B-12 below have higher refractive anisotropy, and higher dielectric anisotropy than that of the terphenyl-based liquid crystal molecule. In the present specification, when the dielectric anisotropy has a negative value, a size of the dielectric anisotropy is on the basis of an absolute value.

Chemical Formula A-11

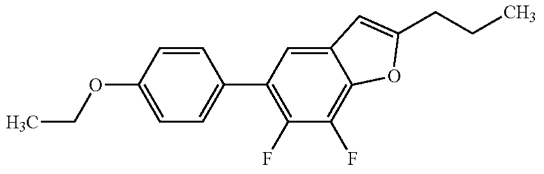

Chemical Formula B-11

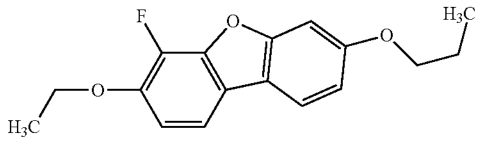

-continued

Chemical Formula B-12

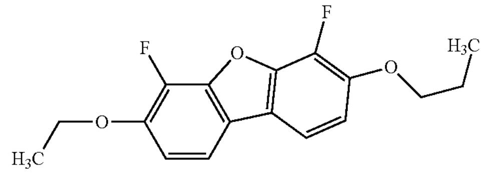

The liquid crystal composition of Example 1 substantially satisfies the physical properties of the liquid crystal composition of Comparative Example, while also having a low rotational viscosity. Accordingly, the liquid crystal composition of Example 1 may have advantages that are not obtainable by including the terphenyl-based liquid crystal molecule of Comparative Example. Also, since the liquid crystal composition of Example 1 has the low rotational viscosity, a response speed of the liquid crystal display may be improved.

FIG. 1 is a graph of the voltage holding ratio versus ultraviolet (UV) light exposure time and of the remaining reactive mesogen content versus time for the liquid crystal compositions of Example 1 and the Comparative Example, showing the change in the response characteristics and change in reliability.

Table 3 below shows a reduction in a degree to which the reactive mesogen (RM) remains in the liquid crystal layer according to the increasing amounts of time (minutes, m) of ultraviolet light exposure.

TABLE 3

| | Remaining RM according to exposure | | | | | |
| --- | --- | --- | --- | --- | --- | --- |
| | 0 m | 20 m | 40 m | 60 m | 80 m | 100 m |
| Comparative Example | 77.0% | 20.7% | 2.6% | 1.8% | 1.4% | 1.1% |
| Example 1 | 81.7% | 18.3% | 4.4% | 2.7% | 1.9% | 1.5% |

Referring to Table 3 and FIG. 1, it may be confirmed that the amount of remaining RM is reduced when the liquid crystal composition of Example 1 is used and is similar to a case where the liquid crystal composition of Comparative Example is used.

Tables 4 and 5 below show a change in the initial reliability and a change in reliability after time passes, respectively. The change in initial reliability shows a change in the voltage holding ratio (VHR) according to the increasing time (min) of the ultraviolet light exposure, and the change in reliability after time passes shows a change in voltage holding ratio after about 168 hours after the ultraviolet light exposure.

TABLE 4

| Voltage holding ratio | Comparative Example | | | | | |
|---|---|---|---|---|---|---|
| (VHR) | 0 m | 20 m | 40 m | 60 m | 80 m | 100 m |
| 0 Hr (Initial) | 99.44% | 99.29% | 99.19% | 99.05% | 98.87% | 98.63% |
| 168 Hr (After time passes) | 99.32% | 99.18% | 98.94% | 98.56% | 98.35% | 98.12% |

TABLE 5

| Voltage holding ratio | Example 1 | | | | | |
|---|---|---|---|---|---|---|
| (VHR) | 0 m | 20 m | 40 m | 60 m | 80 m | 100 m |
| 0 Hr (Initial) | 99.45% | 99.34% | 99.21% | 99.21% | 99.07% | 99.14% |
| 168 Hr (After time passes) | 99.21% | 99.13% | 99.06% | 98.94% | 98.95% | 98.85% |

Referring to Table 4, Table 5, and FIG. 1, it may be confirmed that Example 1 has the same reliability or improved reliability as compared to the Comparative Example.

TABLE 6

| Liquid crystal molecule | Content (wt %) |
|---|---|
| 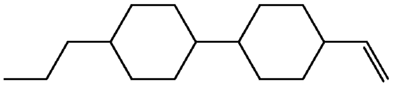 [SMILES: C=CC1CCC(C2CCC(CCC)CC2)CC1] | 10 |
| 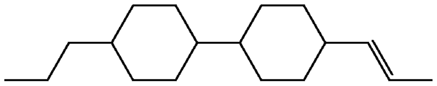 [SMILES: C/C=C/C1CCC(C2CCC(CCC)CC2)CC1] | 10 |
| 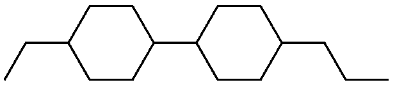 [SMILES: CCCC1CCC(C2CCC(CC)CC2)CC1] | 14 |
| 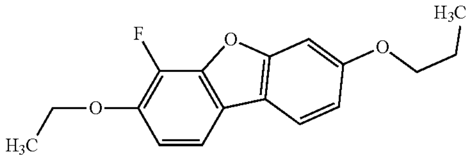 [SMILES: CCCOc1ccc2c(c1)oc1c(F)c(OCC)ccc12] | 6 |
| 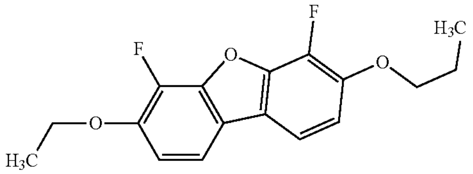 [SMILES: CCCOc1ccc2c(oc3c(F)c(OCC)ccc32)c1F] | 6 |
| 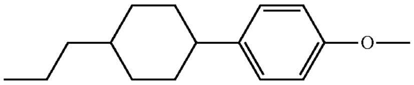 [SMILES: CCCC1CCC(c2ccc(OC)cc2)CC1] | 8 |
| 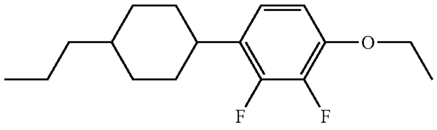 [SMILES: CCCC1CCC(c2ccc(OCC)c(F)c2F)CC1] | 9 |
| 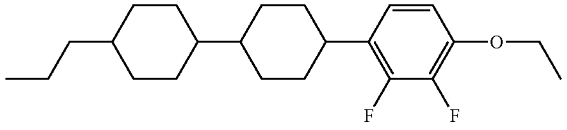 | 7 |

TABLE 6-continued

| Liquid crystal molecule | Content (wt %) |
|---|---|
| 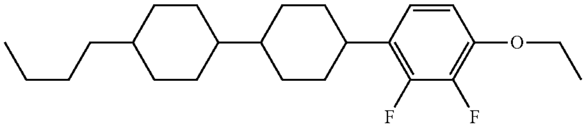 [SMILES: CCCCC1CCC(C2CCC(c3ccc(OCC)c(F)c3F)CC2)CC1] | 6 |
| 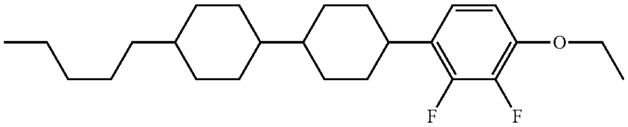 [SMILES: CCCCCC1CCC(C2CCC(c3ccc(OCC)c(F)c3F)CC2)CC1] | 6 |
| 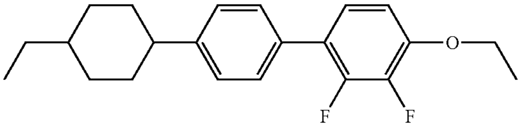 [SMILES: CCOc1ccc(-c2ccc(C3CCC(CC)CC3)cc2)c(F)c1F] | 9 |
| 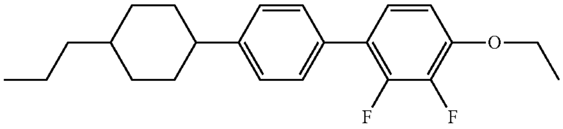 [SMILES: CCCC1CCC(c2ccc(-c3ccc(OCC)c(F)c3F)cc2)CC1] | 9 |

Table 6 above shows the liquid crystal composition according to Example 2. As a result of evaluating physical properties of the liquid crystal composition according to Example 2, the liquid crystal composition of Example 2 has a refractive index anisotropy (Δn) of about 0.109, a dielectric anisotropy (Δε) of about −3.7, a phase transition temperature (Tni) of about 77 degrees Celsius, a band elastic constant (K33) of about 14.2, and a rotational viscosity (γ1) of about 119 mPa·s.

The liquid crystal composition according to Example 2 has a composition including the liquid crystal molecules represented by Chemical Formulas B-11 and B-12 below, while also omitting the terphenyl-based liquid crystal molecule:

Chemical Formula B-11

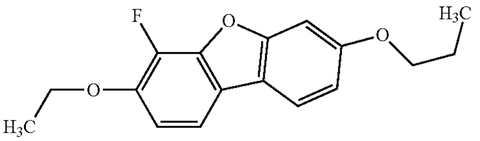

-continued

Chemical Formula B-12

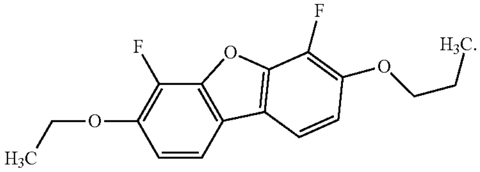

The liquid crystal composition of Example 2 may substantially satisfy the physical properties of the liquid crystal composition of Comparative Example, and may also increase an absolute value of the negative dielectric anisotropy. When the absolute value of the negative dielectric anisotropy is increased, transmittance of the liquid crystal display may be improved.

Figure 2:
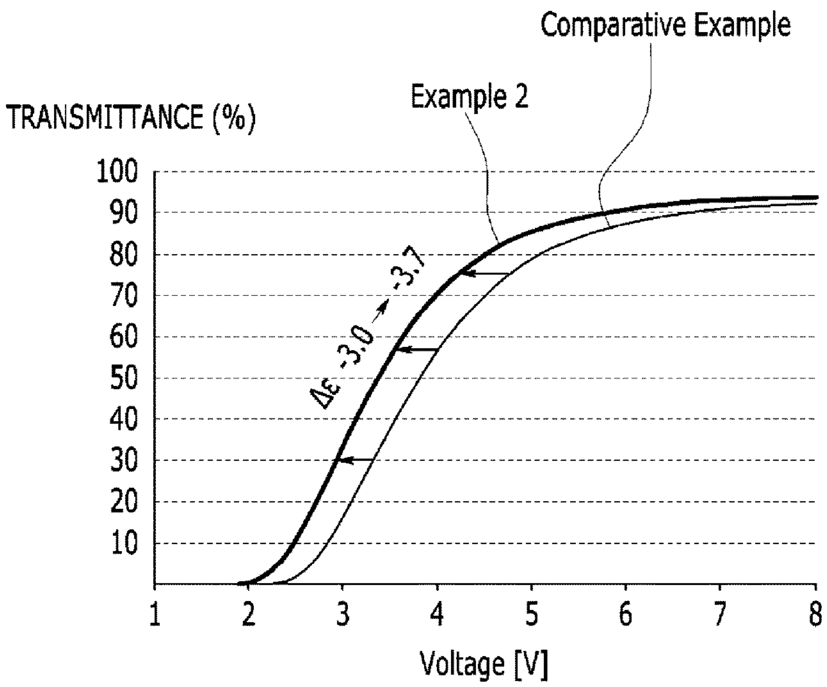
FIG. 2 is a graph of transmittance (%) versus voltage (V), showing a change in transmittance according to a change in dielectric anisotropy.

FIG. 2 is a graph showing a change in transmittance versus voltage, showing a change in transmittance according to a change in the negative dielectric anisotropy.

Referring to FIG. 2, it may be confirmed that when the negative dielectric anisotropy (Δε) is increased from −3.0 to −3.7, the transmittance is improved by 8% or more.

TABLE 7

| Liquid crystal molecule | Content (wt %) |
|---|---|
| 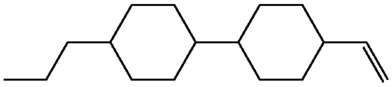 [SMILES: C=CC1CCC(C2CCC(CCC)CC2)CC1] | 10 |
| 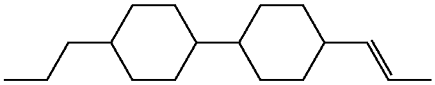 [SMILES: C/C=C/C1CCC(C2CCC(CCC)CC2)CC1] | 11 |
| 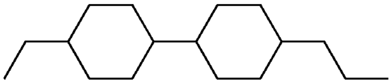 [SMILES: CCCC1CCC(C2CCC(CC)CC2)CC1] | 10 |

TABLE 7-continued
| Liquid crystal molecule | Content (wt %) |
|---|---|
| 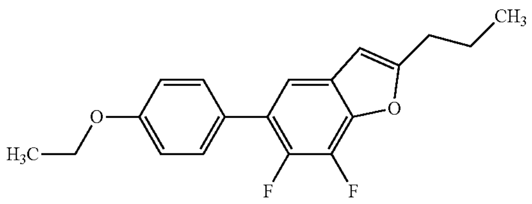 [SMILES: CCCc1cc2cc(-c3ccc(OCC)cc3)c(F)c(F)c2o1] | 4 |
| 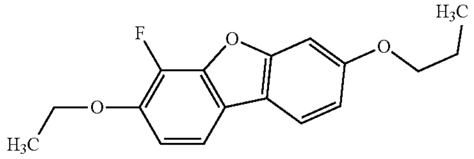 [SMILES: CCCOc1ccc2c(c1)oc1c(F)c(OCC)ccc12] | 4 |
| 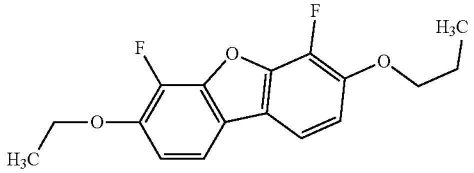 | 4 |
| 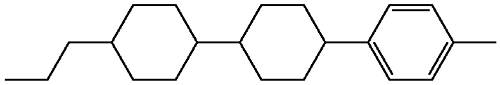 [SMILES: CCCC1CCC(C2CCC(c3ccc(C)cc3)CC2)CC1] | 8 |
| 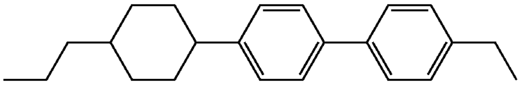 [SMILES: CCCC1CCC(c2ccc(-c3ccc(CC)cc3)cc2)CC1] | 5 |
| 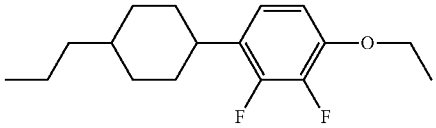 [SMILES: CCCC1CCC(c2ccc(OCC)c(F)c2F)CC1] | 9 |
| 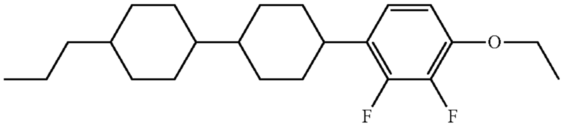 [SMILES: CCCC1CCC(C2CCC(c3ccc(OCC)c(F)c3F)CC2)CC1] | 8 |
| 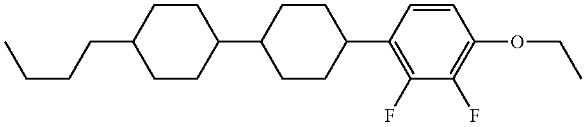 [SMILES: CCCCC1CCC(C2CCC(c3ccc(OCC)c(F)c3F)CC2)CC1] | 9 |
| 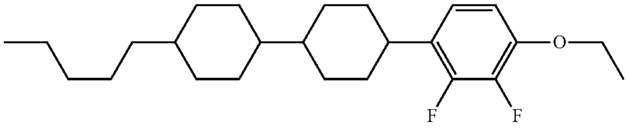 | 5 |
| 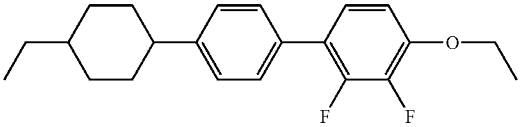 [SMILES: CCOc1ccc(-c2ccc(C3CCC(CC)CC3)cc2)c(F)c1F] | 4 |

TABLE 7-continued

| Liquid crystal molecule | Content (wt %) |
|---|---|
| 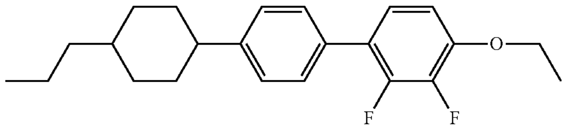 [SMILES: CCCC1CCC(c2ccc(-c3ccc(OCC)c(F)c3F)cc2)CC1] | 9 |

Table 7 above shows the liquid crystal composition according to Example 3. As a result of evaluating physical properties of the liquid crystal composition according to Example 3, the liquid crystal composition of Example 3 has a refractive index anisotropy (Δn) of about 0.110, a dielectric anisotropy (Δε) of about −3.2, a phase transition temperature (Tni) of about 102 degrees Celsius, a band elastic constant (K33) of about 16.5, and a rotational viscosity (γ1) of about 145 mPa·s.

The liquid crystal composition according to Example 3 has a composition including the liquid crystal molecules represented by Chemical Formulas A-11, B-11, and B-12 below while omitting the terphenyl-based liquid crystal molecule:

Chemical Formula A-11

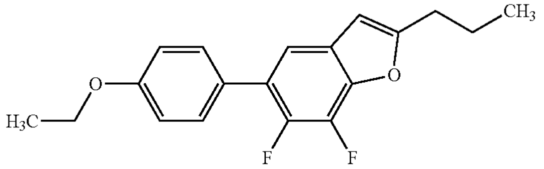

Chemical Formula B-11

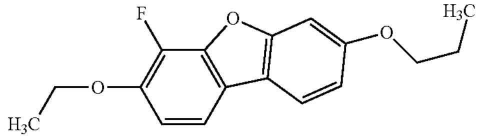

Chemical Formula B-12

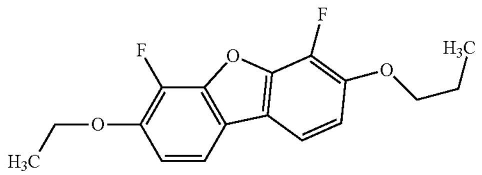

In addition, the liquid crystal composition according to Example 3 does not include a liquid crystal molecule represented by Chemical Formula N-4-1 below included in Examples 1 and 2 as a neutral liquid crystal molecule:

Chemical N-4-1

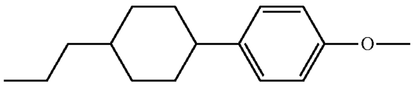

The liquid crystal composition according to Example 3 includes liquid crystal molecules represented by Chemical Formulas N-10-1 and N-11-1 below instead of the neutral liquid crystal molecule represented by Chemical Formula N-4-1 above:

Chemical Formula N-10-1

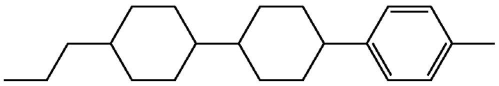

Chemical Formula N-11-1

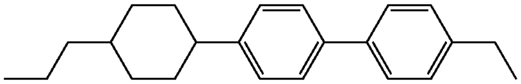

The liquid crystal composition of Example 3 may increase the phase transition temperature (Tni) while substantially satisfying the physical properties of the liquid crystal composition of the Comparative Example. The liquid crystal composition having the high phase transition temperature (Tni) may be used for an outdoor liquid crystal display which is exposed to a large amount of sunlight.

Hereinafter, the liquid crystal display including the liquid crystal composition according to the above-described exemplary embodiments is described.

Figure 3:
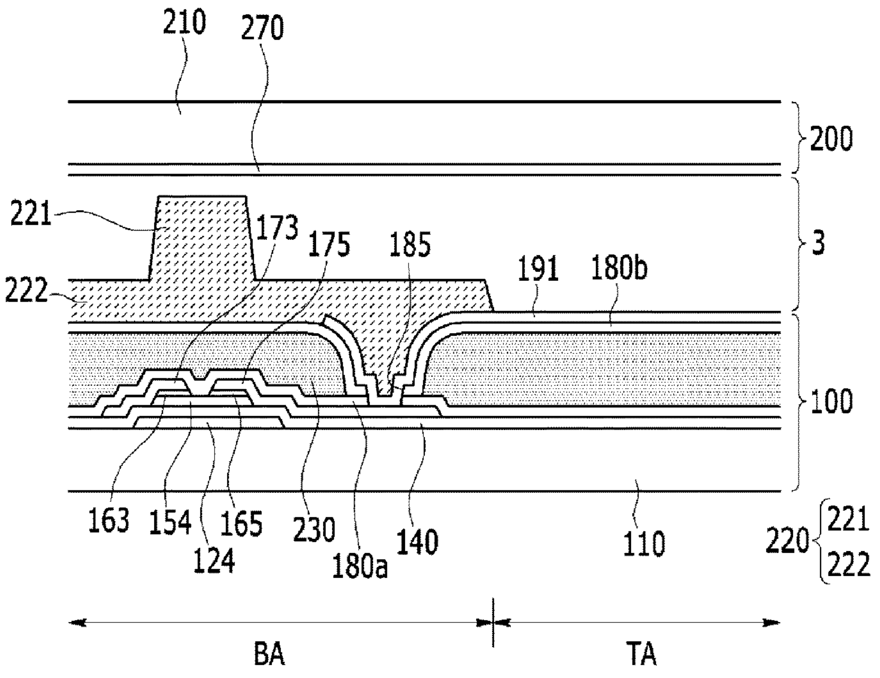
FIG. 3 is a cross-sectional view of a liquid crystal display in which a light blocking member and a spacer are simultaneously formed according to an exemplary embodiment.

FIG. 3 is a cross-sectional view showing the liquid crystal display in which a light blocking member and a spacer are simultaneously formed.

Referring to FIG. 3, the liquid crystal display according to an exemplary embodiment may include a lower display panel 100 and an upper display panel 200 overlapping and facing each other, and a liquid crystal layer 3 interposed between the two display panels 100 and 200.

First, in the lower display panel 100, a plurality of gate lines (not shown) is positioned on a first substrate 110. Each gate line includes a gate electrode 124 that protrudes from the gate line or a portion of the gate line. A gate insulating layer 140 is positioned on the gate electrode 124, a semiconductor layer 154 is positioned on the gate insulating layer 140, and the semiconductor layer 154 overlaps the gate electrode 124.

The semiconductor layer 154 may include amorphous silicon, polycrystalline silicon, an oxide semiconductor, or the like.

Ohmic contact members 163 and 165 may be positioned on the semiconductor layer 154. The ohmic contact members 163 and 165 may be formed of n+ hydrogenated amorphous silicon materials in which silicide or n-type impurities are doped at a high concentration. The ohmic contact members 163 and 165 may be omitted.

A source electrode 173 and a drain electrode 175 are positioned on the ohmic contact members 163 and 165 and the gate insulating layer 140. A plurality of data lines (not shown) may be positioned on the gate insulating layer 140, and each data line may be connected with the source electrode 173.

The gate electrode 124, the source electrode 173, and the drain electrode 175 form a thin film transistor as a switching element together with the semiconductor layer 154.

A first insulating layer 180*a* may be positioned on the source electrode 173 and the drain electrode 175, and the first insulating layer 180*a* may be connected to the semiconductor layer 154 at a space between the source electrode 173 and the drain electrode 175. The first insulating layer 180*a* may be made of an organic insulating material or an inorganic insulating material, and may include a single layer or a multilayer.

A color filter 230 may be positioned on the first insulating layer 180*a*. The color filter 230 may represent one of the primary colors such as three primary colors of red, green and blue, four primary colors, or the like. The color filter 230 is not limited to the three primary colors of red, green, and blue, but may represent one of cyan-based, magenta-based, yellow-based, or white-based primary colors.

A second insulating layer 180*b* may be positioned on the color filter 230, and the second insulating layer 180*b* may include the inorganic insulating material or the organic insulating material. The second insulating layer 180*b* may act as an overcoat with regard to the color filter 230 to prevent the color filter 230 from being exposed to the outside and to implement a planation surface. The second insulating layer 180*b* may be omitted.

A pixel electrode 191 is positioned on the second insulating layer 180*b*, and a large portion of the pixel electrode 191 is positioned in a transmission area TA. The above-described gate line, data line, thin film transistor, etc., are positioned in a light blocking area BA through which light is not transmitted. The transmission area TA may be a region in which most images are displayed and through which light is able to be transmitted, and the light blocking area BA is not the region in which images are displayed, but instead is a region through which light is unable to be transmitted in most part.

The first insulating layer 180*a* and the second insulating layer 180*b* may have a contact hole 185 formed therein, and a drain electrode 175 may be electrically connected to a pixel electrode 191 through the contact hole 185.

A light blocking member 220 is positioned on the second insulating layer 180*b* and the pixel electrode 191. The light blocking member 220 is positioned in the light blocking area BA. The light blocking member 220 is also referred to as a black matrix.

The light blocking member 220 includes a spacer 221 and a main light blocking part 222. The main light blocking part 222 is formed in the light blocking area (BA) in which the gate line, the data line, the thin film transistor, etc., are positioned to prevent light leakage, and may have a generally planar top surface. The main light blocking part 222 may overlap the contact hole 185. The main light blocking part 222 overlapping the contact hole 185 may fill in the contact hole 185 to smooth a surface and to prevent peripheral light leakage.

The spacer 221 is connected to the main light blocking part 222. The spacer 221 may be positioned on the thin film transistor and/or a signal line such as the gate line, the data line. In FIG. 3, the spacer 221 may be spaced apart from the upper display panel 200, and as an alternative embodiment, the spacer 221 may be in contact with the upper display panel 200.

The spacer 221 acts to maintain a cell gap between the upper display panel 200 and the lower display panel 100 as a main spacer, and when a distance between the upper display panel 200 and the lower display panel 100 in the liquid crystal display is reduced by the application of external pressure, the spacer 221 acts to maintain a cell gap between the upper display panel 200 and the lower display panel 100 as a sub spacer.

As an alternative embodiment to a single spacer 221, a plurality of spacers 221 may be formed in one light blocking area BA, and a first spacer and a second spacer having different heights on the basis of the main light blocking part 222, may be formed. When a height of the first spacer is higher than that of the second spacer, the first spacer may be the main spacer, and the second spacer may be the sub spacer.

Although not shown, a first alignment layer may be formed on the pixel electrode 191, and the first alignment layer may be a vertical alignment layer.

In the upper display panel 200, a common electrode 270 may be positioned between the second substrate 210 and the liquid crystal layer 3. The common electrode 270 may be formed as a whole plate on an entire surface of the second substrate 210 facing the liquid crystal layer 3. Although not shown, a second alignment layer may be positioned between the common electrode 270 and the liquid crystal layer 3, and the second alignment layer may be a vertical alignment layer.

The liquid crystal layer 3 includes liquid crystal molecules. The liquid crystal molecules may have a negative dielectric anisotropy, and in a state in which an electric field is produced in the liquid crystal layer 3, the liquid crystal molecules adjacent to the first substrate 110 and the second substrate 210 may be oriented in a substantially vertical direction. The liquid crystal molecules may have a pre-tilt in a predetermined direction in a state in which the electric field is not produced in the liquid crystal layer 3.

The above-described liquid crystal composition according to an exemplary embodiment may be applied to features of the liquid crystal molecules included in the liquid crystal layer 3. In other words, the liquid crystal layer 3 of the liquid crystal display according to the present exemplary embodiment may be formed using the liquid crystal composition as described above.

A plurality of bumps are formed in the liquid crystal layer 3 by a light reaction of the reactive mesogen, and the bumps may be adjacent to the first alignment layer and the second alignment layer.

Figure 4:
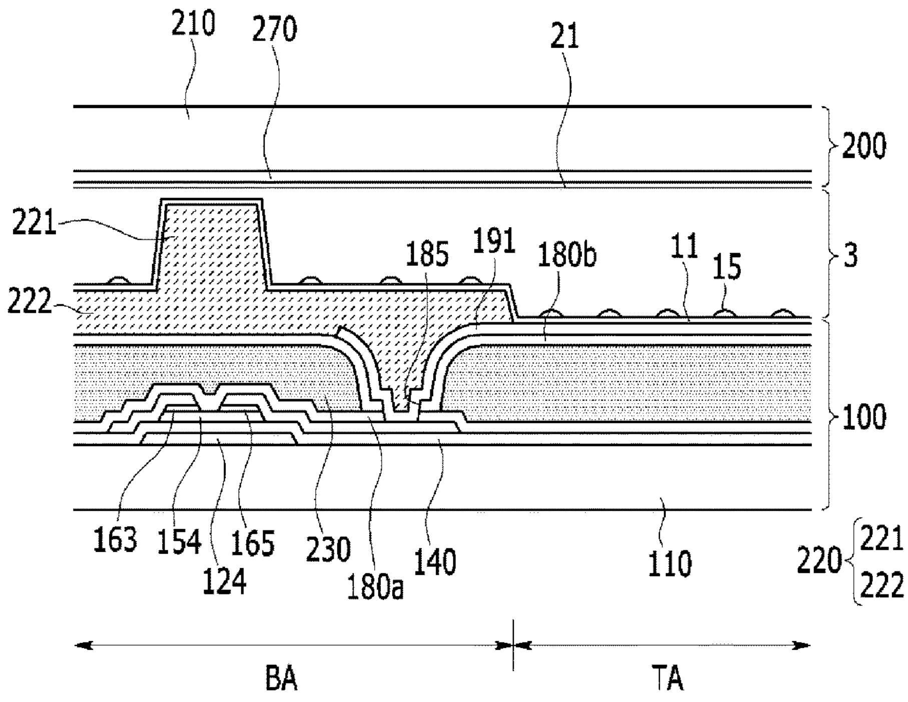
FIG. 4 is a cross-sectional view of a liquid crystal display in which liquid crystal molecules adjacent to first and second alignment layers have different pre-tilts according to an exemplary embodiment.

FIG. 4 is a cross-sectional view showing the liquid crystal display according to an exemplary embodiment, capable of reducing a texture of a curved liquid crystal display.

Referring to FIG. 4, most of constituent elements are the same as described in FIG. 3, and the portions of FIG. 4 which are different from FIG. 3 are described below. Similar to the exemplary embodiment of FIG. 3, in FIG. 4 the above-described liquid crystal composition according to an exemplary embodiment may be applied to features of the liquid crystal molecules included in the liquid crystal layer 3. In other words, the liquid crystal layer 3 of the liquid crystal display according to the present exemplary embodiment may be formed using the liquid crystal composition as described above.

Referring to FIG. 4, the first alignment layer 11 is shown between the pixel electrode 191 and the liquid crystal layer 3, and the second alignment layer 21 is shown between the common electrode 270 and the liquid crystal layer 3.

The first and second alignment layers 11 and 21 may be vertical alignment layers. The first and second alignment layers 11 and 21 are formed of a polymer including a main chain and a plurality of side chains connected to the main chain, respectively. The first alignment layer 11 includes at least one side chain including at least one of a vertical orientation group, a light reactive group, and a light reaction derivative. The composition of the first alignment layer 11 is unlike the composition of the second alignment layer 21. The light reactive group included in the side chain acts to increase reactivity during polymerization of the reactive mesogen. The light reactive group may be polymerized with the reactive mesogen to form the light reaction group derivative.

The light reactive group may be selected from among various types of materials that are capable of absorbing light so as to initiate a polymerization reaction, thereby generating a radical.

The light reactive groups may include at least one of compounds represented by Chemical Formula L-1, Chemical Formula L-2, Chemical Formula L-3, Chemical Formula L-4, and Chemical Formula L-5 below:

Chemical Formula L-1

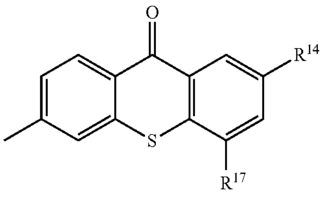

Chemical Formula L-2

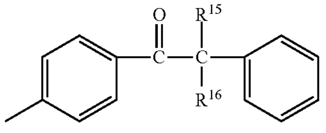

Chemical Formula L-3

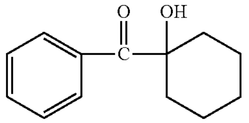

Chemical Formula L-4

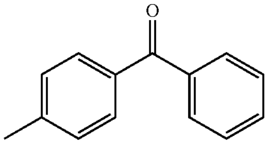

Chemical Formula L-5

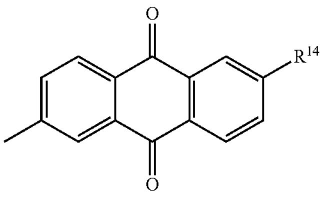

where in Chemical Formula L-1, Chemical Formula L-2, and Chemical Formula L-5, $R^{14}$ is independently hydrogen or a substituted or unsubstituted C1-C8 alkyl group, $R^{15}$ and $R^{16}$ are each independently a hydroxy group or a substituted or unsubstituted C1-C8 alkoxy group, $R^{17}$ is hydrogen, a hydroxy group, or a substituted or unsubstituted C1-C8 alkoxy group.

Unless particularly described in the present specification, the term “substituted” means that at least one hydrogen atom is substituted with a halogen atom (F, Cl, Br, I), a hydroxy group, a C1-C20 alkoxy group, a nitro group, a cyano group, an amino group, an imino group, an azido group, an amidino group, a hydrazino group, a hydrazono group, a carbonyl group, a carbamyl bran, a thiol group, an ester group, an ether group, a carboxyl group or a salt thereof, a sulfonic acid group or a salt thereof, a phosphoric acid or a salt thereof, a C1-C20 alkyl group, a C2-C20 alkenyl group, a C2-C20 alkynyl group, a C6-C30 aryl group, a C3-C20 cycloalkyl group, a C3-C20 cycloalkenyl group, a C3-C20 cycloalkynyl group, a C2-C20 heterocycloalkyl group, a C2-C20 heterocycloalkenyl group, a C2-C20 heterocycloalkynyl group, or a C3-C30 heteroaryl group or a combination thereof.

In the present exemplary embodiment, the plurality of bumps 15 is formed on a surface of the first alignment layer 11. The bumps 15 may be formed by light irradiation of the reactive mesogen, which is the orientation aid included in the liquid crystal layer 3. Here, the light irradiation may be ultraviolet (UV) light irradiation. The bump 15 includes an orientation polymer. The orientation polymer may be formed by UV light irradiation of the reactive mesogen included in the liquid crystal layer 3, or may be formed by UV light irradiation after the reactive mesogen, which is mixed in an orientation material forming the first and second alignment layers 11 and 21, is eluted in the liquid crystal layer 3 during a bake process.

The orientation polymer formed as described above, acts to control the pre-tilt which is an initial alignment direction of the liquid crystal molecules. Here, the UV light reactive group included in the side chain of the polymer of the first alignment layer 11 may increase the polymerization reactivity of the reactive mesogen according to the present exemplary embodiment to assist in the formation of the bumps 15, or may react with unreacted remaining reactive mesogen to remove the remaining reactive mesogen.

In FIG. 4, the plurality of bumps 15 are shown only between the first alignment layer 11 and the liquid crystal layer 3. However, in an alternative embodiment, the plurality of bumps 15 may be formed between the second alignment layer 21 and the liquid crystal layer 3, wherein the number of bumps formed between the second alignment layer 21 and the liquid crystal layer 3 may be much less than the number of bumps 15 formed between the first alignment layer 11 and the liquid crystal layer 3. Specifically, upon comparing a bump density corresponding to the number of bumps in a defined unit area, the bump density of bumps positioned between the first alignment layer 11 and the liquid crystal layer 3 is larger than the bump density of bumps positioned between the second alignment layer 11 and the liquid crystal layer 3. A size of the bump positioned between the first alignment layer 11 and the liquid crystal layer 3 may be smaller than the size of the bump positioned between the second alignment layer 21 and the liquid crystal layer 3.

By forming a display panel in which the bump density of the lower display panel 100 is different from the bump density of the upper display panel 200, a pre-tilt angle of the liquid crystal molecules adjacent to the first alignment layer 11 may be different from the pre-tilt angle of the liquid crystal molecules adjacent to the second alignment layer 21. The density of the bumps 15 positioned on the first alignment layer 11 may be increased such that the pre-tilt of the liquid crystal molecules adjacent to the first alignment layer 11 may be larger than the pre-tilt of the liquid crystal molecules adjacent to the second alignment layer 21. For example, the liquid crystal molecules adjacent to the first alignment layer 11 may have an angle of about 80 degrees to less than about 89 degrees with regard to the surface of the first alignment layer 11, and the liquid crystal molecules positioned adjacent to the second alignment layer 21 may be arranged in an angle of about 89 degrees to about 90 degrees so as to be substantially and nearly vertical with regard to the surface of the second alignment layer 21. The term "pre-tilt" as used in the present exemplary embodiment refers to a degree at which the liquid crystal molecules are tilted in a vertical direction relative to the surfaces of the first and second alignment layers 11 and 21.

As an exemplary variation of the exemplary embodiment shown in FIG. 4, the first alignment layer 11 may be formed into the vertical alignment layer, and the second alignment layer 21 may be basically formed into the vertical alignment layer, and may have the side chain which includes a light stabilizer as well as the vertical orientation group. Since the polymerization reaction of the reactive mesogen is largely generated on the surface of the first alignment layer 11 by the light stabilizer included in the second alignment layer 21 at the time of the UV light irradiation of the first and second alignment layers 11 and 21, the plurality of bumps 15 may be relatively and largely formed on the surface of the first alignment layer 11. Accordingly, the pre-tilt of the liquid crystal molecules adjacent to the first alignment layer 11 may be different from the pre-tilt of the liquid crystal molecules adjacent to the second alignment layer 21.

In the exemplary embodiment of FIG. 3, the pre-tilt of the liquid crystal molecules adjacent to the first alignment layer 11 may be the same as that of the liquid crystal molecules adjacent to the second alignment layer 21, whereas in the exemplary embodiment of FIG. 4, the pre-tilt of the liquid crystal molecules adjacent to the first alignment layer 11 is different from the pre-tilt of the liquid crystal molecules adjacent to the second alignment layer 21.

The description in which the main light blocking part 222 and the spacer are simultaneously formed as shown in FIG. 3 may not necessarily be applied to the exemplary embodiment of FIG. 4. As an alternative embodiment, it is possible to separately form the main light blocking part 222 and the spacer 221.

Figure 5:
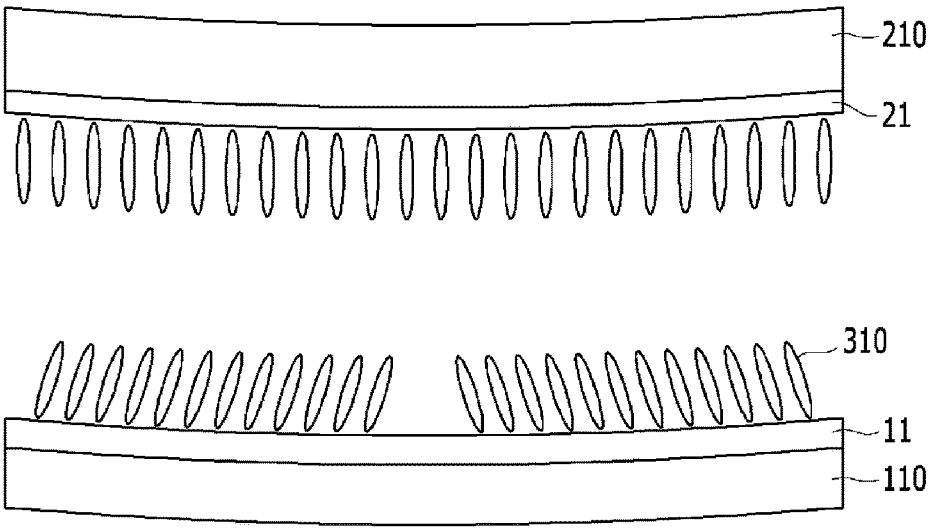
FIG. 5 shows a display panel that is bent to form a curved liquid crystal display.

FIG. 5 shows a display panel that is bent to form a curved liquid crystal display. FIG. 5 schematically shows the first and second substrates 110 and 210 facing each other, the first and second alignment layers 11 and 21, and the liquid crystal molecules 310 for convenience of description. In addition, FIG. 5 shows the portion corresponding to the transmission area TA in FIG. 4, which illustrates a cross section of a display panel taken along a horizontal direction. The horizontal direction corresponds to a right to left direction when observed by a viewer watching the display portion of the liquid crystal display.

Referring to FIG. 5, the first substrate 110 and the second substrate 210 may be bent into a curved surface.

In a case where the first alignment layer 11 and the second alignment layer 21 face each other, and where the liquid crystal molecules 310 have a pre-tilt in the same direction as each other in the region in which the first alignment layer 11 and the second alignment layer 21 overlap with each other, when bending the display panel, a region in which a pre-tilt direction of the liquid crystal molecules 310 adjacent to the first alignment layer 11 is unmatched with (e.g. different from) the pre-tilt direction of the liquid crystal molecules 310 adjacent to the second alignment layer 21, may occur. The region may occur at a boundary of a neighboring domain. This region has a problem such that a texture defect occurs in a screen in a direction in which the liquid crystal molecules 310 are tilted.

However, when bending the liquid crystal display according to an exemplary embodiment shown in FIG. 4, in order to form the curved liquid crystal display as shown in FIG. 5, a texture region does not occur at the boundary of the neighboring domain region.

As described above, in the exemplary embodiments of FIGS. 4 and 5, since the above-described liquid crystal composition is used to form the liquid crystal layer 3, and the pre-tilt of the liquid crystal molecules adjacent to the first alignment layer 11 is different from the pre-tilt of the liquid crystal molecules adjacent to the second alignment layer 21, the texture defect may be prevented at the time of forming the curved liquid crystal display, while maintaining high speed response characteristics, etc.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A liquid crystal composition comprising: at least one liquid crystal molecule represented by Chemical Formulas A and B:

Chemical Formula A

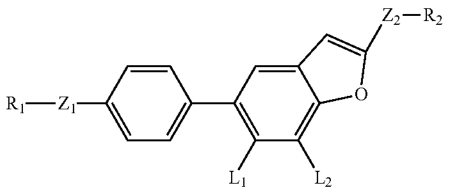

Chemical Formula B

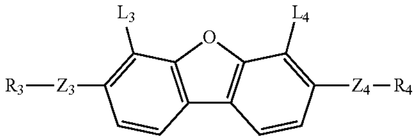

where in Chemical Formulas A and B, $L_1$ to $L_3$ are each independently —H, —F, —Cl, —$OCF_3$, —$CF_3$, —$CH_2F$, or —$CHF_2$, $L_4$ is H, $R_1$ to $R_4$ are each independently hydrogen, a halogen, a cyano group, a C1-C12 alkyl group, or a C1-C12 alkoxy group, and $Z_1$ to $Z_4$ are each independently a single bond, —O—, —COO—, —OCO—, —$CF_2O$—, —$OCF_2$-, —$CH_2O$—, —$OCH_2$-, —$SCH_2$-, —$CH_2S$—, —$CH_2CH_2$-, —$C_2F_4$-, —$CH_2CF_2$-, —$CF_2CH_2$-, —$CH_{2n}$-, wherein n is a natural number of 1 to 12, —CH═CH—, —CF═CF—, —CH═CF—, —CF═CH—, —C≡C—, or —CH═$CHCH_2O$—.

2. The liquid crystal composition of claim 1, further comprising:

at least one liquid crystal molecule represented by Chemical Formulas N-1 to N-4:

Chemical Formula N-1

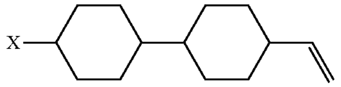

-continued

Chemical Formula N-2

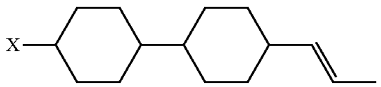

Chemical Formula N-3

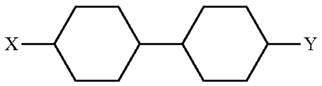

Chemical Formula N-4

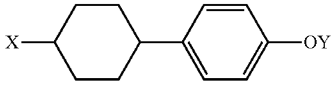

where in Chemical Formulas N-1 to N-4, X and Y are each independently a C1-C5 alkyl group.

3. The liquid crystal composition of claim 2, further comprising:

at least one liquid crystal molecule represented by Chemical Formulas N-5 to N-9:

Chemical Formula N-5

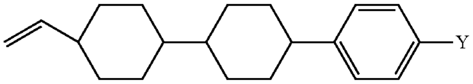

Chemical Formula N-6

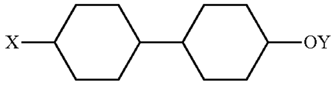

Chemical Formula N-7

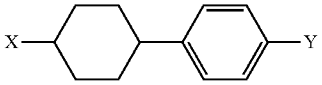

Chemical Formula N-8

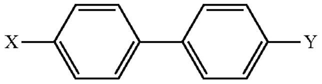

Chemical Formula N-9

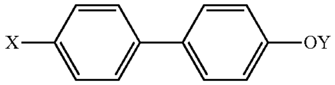

where in Chemical Formulas N-5 to N-9, X and Y are each independently a C1-C5 alkyl group.

4. The liquid crystal composition of claim 2, further comprising:

at least one liquid crystal molecule represented by Chemical Formulas P-1 to P-3:

Chemical Formula P-1

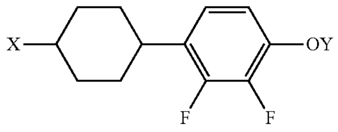

-continued

Chemical Formula P-2

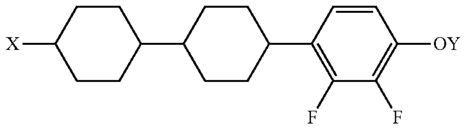

Chemical Formula P-3

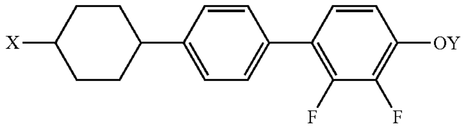

where in Chemical Formulas P-1 to P-3, X and Y are each independently a C1-C5 alkyl group.

5. The liquid crystal composition of claim 4, further comprising:

at least one liquid crystal molecule represented by Chemical Formulas P-4 to P-10:

Chemical Formula P-4

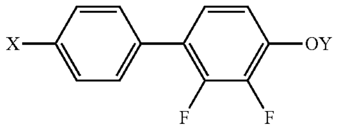

Chemical Formula P-5

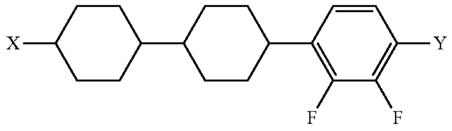

Chemical Formula P-6

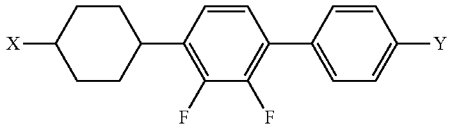

Chemical Formula P-7

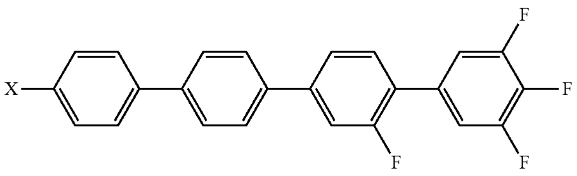

Chemical Formula P-8

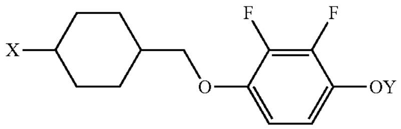

Chemical Formula P-9

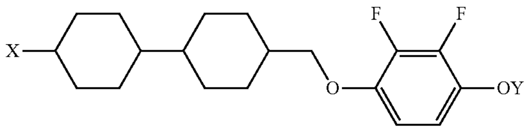

-continued

Chemical Formula P-10

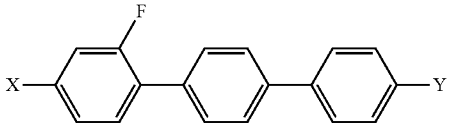

where in Chemical Formulas P-4 to P-10, X and Y are each independently a C1-C5 alkyl group.

6. The liquid crystal composition of claim 1, further comprising:

at least one liquid crystal molecule represented by Chemical Formulas N-1 to N-3, N-10, or N-11:

Chemical Formula N-1

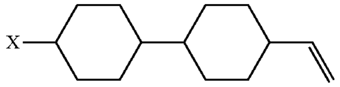

Chemical Formula N-2

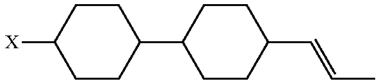

Chemical Formula N-3

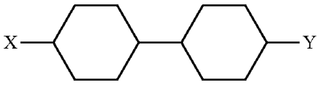

Chemical Formula N-10

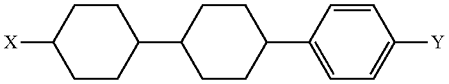

Chemical Formula N-11

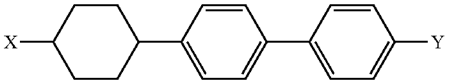

where in Chemical Formulas N-1 to N-3, N-10, and N-11, X and Y are each independently a C1-C5 alkyl group.

7. The liquid crystal composition of claim 6, further comprising:

at least one liquid crystal molecule represented by Chemical Formulas N-5 to N-9:

Chemical Formula N-5

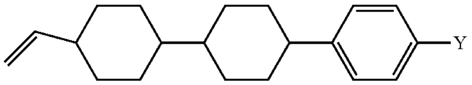

Chemical Formula N-6

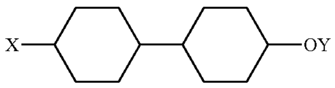

Chemical Formula N-7

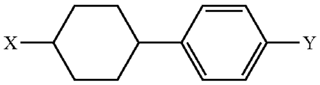

-continued

Chemical Formula N-8

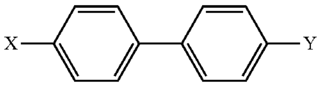

Chemical Formula N-9

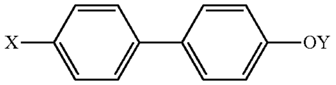

where in Chemical Formulas N-5 to N-9, X and Y are each independently a C1-C5 alkyl group.

8. The liquid crystal composition of claim 6, further comprising:

at least one liquid crystal molecule represented by Chemical Formulas P-1 to P-3:

Chemical Formula P-1

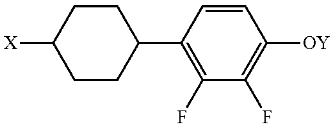

Chemical Formula P-2

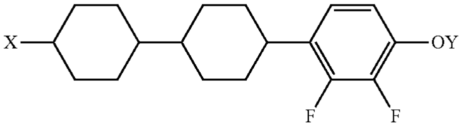

Chemical Formula P-3

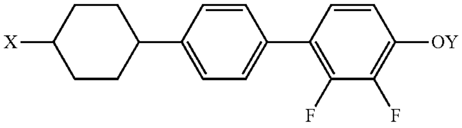

where in Chemical Formulas P-1 to P-3, X and Y are each independently a C1-C5 alkyl group.

9. The liquid crystal composition of claim 8, further comprising:

at least one liquid crystal molecule represented by Chemical Formulas P-4 to P-10:

Chemical Formula P-4

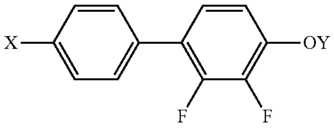

Chemical Formula P-5

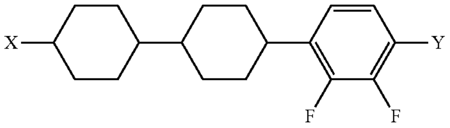

Chemical Formula P-6

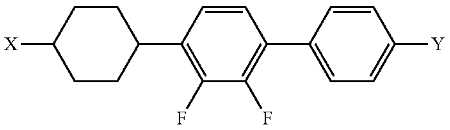

-continued

Chemical Formula P-7

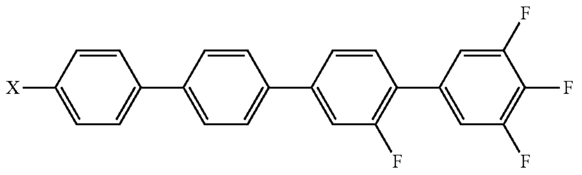

Chemical Formula P-8

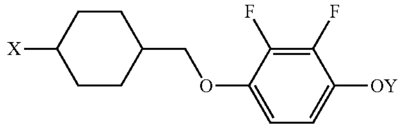

Chemical Formula P-9

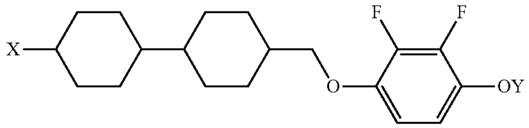

Chemical Formula P-10

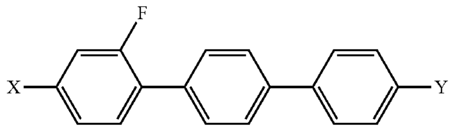

where in Chemical Formulas P-4 to P-10, X and Y are each independently a C1-C5 alkyl group.

10. The liquid crystal composition of claim 1, wherein:

Chemical Formula A is Chemical Formula A-1, and Chemical Formula B is Chemical Formula B-1:

Chemical Formula A-1

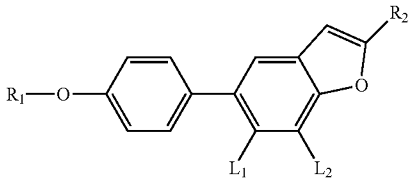

Chemical Formula B-1

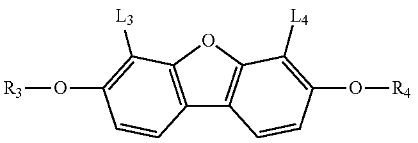

where in Chemical Formulas A-1 and B-1, $L_1$ to $L_3$ are each independently —H, —F, —Cl, —$OCF_3$, —$CF_3$, —$CH_2F$, or —$CHF_2$, $L_4$ is H, and $R_1$ to $R_4$ are each independently hydrogen, a halogen, a cyano group, a C1-C12 alkyl group, or a C1-C12 alkoxy group.

11. The liquid crystal composition of claim 1, wherein:

the at least one liquid crystal molecule represented by Chemical Formula A is present in an amount of about 1 weight percent to about 10 weight percent, based on a total weight of the liquid crystal composition.

12. A liquid crystal display comprising:

a first substrate, a second substrate overlapping the first substrate, and a liquid crystal layer positioned between the first substrate and the second substrate, and comprising at least one liquid crystal molecule represented by Chemical Formulas A and B:

Chemical Formula A

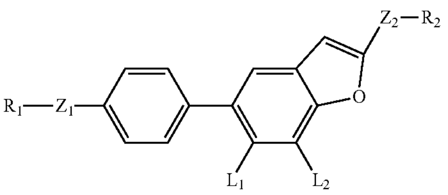

Chemical Formula B

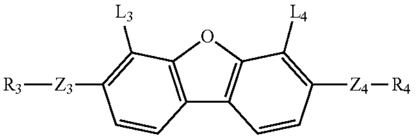

where in Chemical Formulas A and B, $L_1$ to $L_3$ are each independently —H, —F, —Cl, —$OCF_3$, —$CF_3$, —$CH_2F$, or —$CHF_2$, $L_4$ is H, $R_1$ to $R_4$ are each independently hydrogen, a halogen, a cyano group, a C1-C12 alkyl group, or a C1-C12 alkoxy group, and $Z_1$ to $Z_4$ are each independently a single bond, —O—, —COO—, —OCO—, —$CF_2O$—, —$OCF_{2}$-, —$CH_2O$—, —$OCH_{2}$-, —$SCH_{2}$-, —$CH_2S$—, —$CH_2CH_{2}$-, —$C_2F_{4}$-, —$CH_2CF_{2}$-, —$CF_2CH_{2}$-, —$CH_{2}$-, wherein n is a natural number of 1 to 12, —CH=CH—, —CF=CF—, —CH=CF—, —CF=CH—, —C≡C—, or —CH=$CHCH_2O$—.

13. The liquid crystal display of claim 12, wherein:

the liquid crystal layer further comprises at least one liquid crystal molecule represented by Chemical Formulas N-1 to N-4:

Chemical Formula N-1

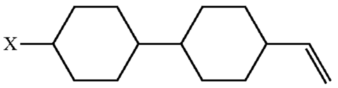

Chemical Formula N-2

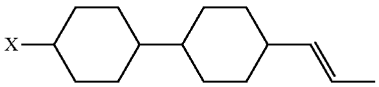

Chemical Formula N-3

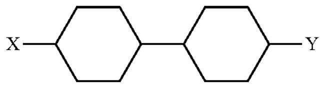

Chemical Formula N-4

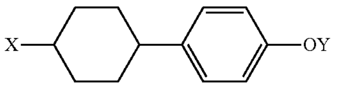

where in Chemical Formulas N-1 to N-4, X and Y are each independently a C1-C12 alkyl group.

14. The liquid crystal display of claim 13, wherein:

the liquid crystal layer further comprises at least one liquid crystal molecule represented by Chemical Formulas P-1 to P-3:

Chemical Formula P-1

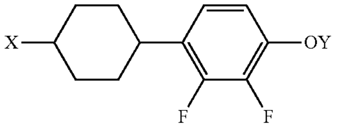

Chemical Formula P-2

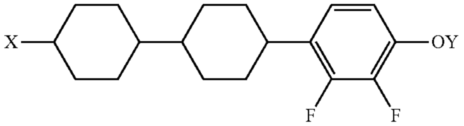

Chemical Formula P-3

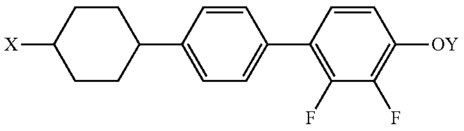

where in Chemical Formulas P-1 to P-3, X and Y are each independently a C1-C12 alkyl group.

15. The liquid crystal display of claim 12, wherein:

the liquid crystal layer further comprises at least one liquid crystal molecule represented by Chemical Formulas N-1 to N-3, N-10, or N-11:

Chemical Formula N-1

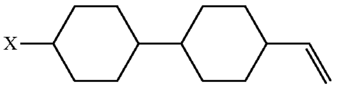

Chemical Formula N-2

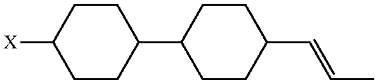

Chemical Formula N-3

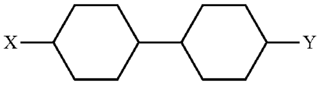

Chemical Formula N-10

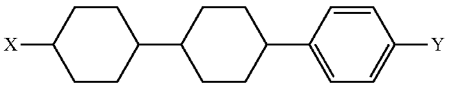

Chemical Formula N-11

where in Chemical Formulas N-1 to N-3, N-10, and N-11, X and Y are each independently a C1-C12 alkyl group.

16. The liquid crystal display of claim 15, wherein:

the liquid crystal layer further comprises at least one liquid crystal molecule represented by Chemical Formulas P-1 to P-3:

Chemical Formula P-1

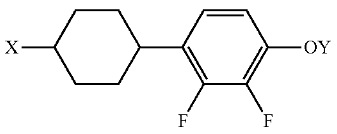

-continued

Chemical Formula P-2

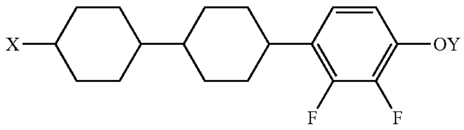

Chemical Formula P-3

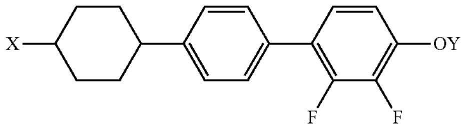

where in Chemical Formulas P-1 to P-3, X and Y are each independently a C1-C12 alkyl group.

17. The liquid crystal display of claim 12, wherein:

Chemical Formula A is Chemical Formula A-1, and Chemical Formula B is Chemical Formula B-1:

Chemical Formula A-1

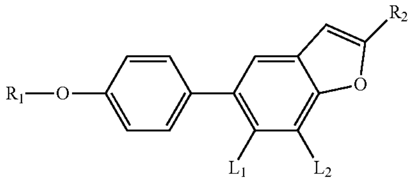

Chemical Formula B-1

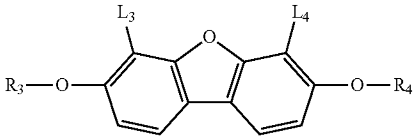

where in Chemical Formulas A-1 and B-1, $L_1$ to $L_3$ are each independently —H, —F, —Cl, —$OCF_3$, —$CF_3$, —$CH_2F$, or —$CHF_2$, $L_4$ is H, and $R_1$ to $R_4$ are each independently hydrogen, a halogen, a cyano group, a C1-C12 alkyl group, or a C1-C12 alkoxy group.

18. The liquid crystal display of claim 12, further comprising:

a light blocking member between the first substrate and the liquid crystal layer, wherein the light blocking member comprises a main light blocking part and a spacer connected to the main light blocking part.

19. The liquid crystal display of claim 12, further comprising:

a first alignment layer between the first substrate and the liquid crystal layer, a second alignment layer between the second substrate and the liquid crystal layer, and a plurality of bumps between the first alignment layer and the liquid crystal layer.

20. The liquid crystal display of claim 19, wherein:

a pre-tilt of liquid crystal molecules adjacent to the first alignment layer is different from a pre-tilt of liquid crystal molecules adjacent to the second alignment layer.

21. The liquid crystal composition of claim 1, further comprising a liquid crystal molecule represented by Chemical Formula B-12:

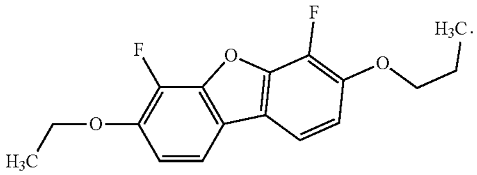
* * * * *